(12) United States Patent
Yang et al.

(10) Patent No.: US 12,459,830 B2
(45) Date of Patent: Nov. 4, 2025

(54) PLATE-LIKE ALUMINA PARTICLE AND METHOD FOR MANUFACTURING PLATE-LIKE ALUMINA PARTICLE

(71) Applicant: DIC Corporation, Tokyo (JP)

(72) Inventors: Shaowei Yang, Shandong (CN); Tomoki Dohi, Chiba (JP); Hironobu Oki, Chiba (JP); Jianjun Yuan, Chiba (JP); Cheng Liu, Shandong (CN); Meng Li, Shandong (CN); Wei Zhao, Shandong (CN)

(73) Assignee: DIC Corporation, Tokyo (JP)

( * ) Notice: Subject to any disclaimer, the term of this patent is extended or adjusted under 35 U.S.C. 154(b) by 790 days.

(21) Appl. No.: 17/766,716

(22) PCT Filed: Oct. 9, 2019

(86) PCT No.: PCT/CN2019/110122
§ 371 (c)(1),
(2) Date: Apr. 5, 2022

(87) PCT Pub. No.: WO2021/068125
PCT Pub. Date: Apr. 15, 2021

(65) Prior Publication Data
US 2023/0096825 A1    Mar. 30, 2023

(51) Int. Cl.
*C01F 7/30*  (2022.01)
*C01F 7/442* (2022.01)
(Continued)

(52) U.S. Cl.
CPC .............. *C01F 7/30* (2013.01); *C01F 7/442* (2013.01); *C08K 7/24* (2013.01); *C01P 2002/74* (2013.01);
(Continued)

(58) Field of Classification Search
CPC ........ C01F 7/30; C01F 7/442; C01P 2002/74; C01P 2002/85; C01P 2004/03;
(Continued)

(56) References Cited

U.S. PATENT DOCUMENTS

| 11,905,420 B2* | 2/2024 | Takada ................. C01G 39/006 |
| 11,926,531 B2* | 3/2024 | Takada .................... C01F 7/442 |

(Continued)

FOREIGN PATENT DOCUMENTS

| JP | 5141920 B2 | 2/2013 |
| JP | 2013-102122 A | 5/2013 |

(Continued)

OTHER PUBLICATIONS

Notification of Reasons for Revocation issued in corresponding Japanese Patent Application No. 2022-518211, dated Jul. 18, 2023.
(Continued)

*Primary Examiner* — Shuangyi Abu Ali
(74) *Attorney, Agent, or Firm* — Rimon P.C.

(57) ABSTRACT

A plate-like alumina particle, in which a ratio I(006)/I(113) of a peak intensity I(006) at 2θ=41.6±0.3 degrees which corresponds to a (006) face to a peak intensity I(113) at 2θ=43.3±0.3 degrees which corresponds to a (113) face of diffraction peaks obtained by X-ray diffraction measurement using a Cu-Kα ray, is 0.2 or more. A method for manufacturing the plate-like alumina particle including mixing an aluminum compound including an aluminum element, a molybdenum compound including a molybdenum element, and a shape-controlling agent to produce a mixture and firing the mixture.

7 Claims, 1 Drawing Sheet

EXAMPLE 1

(51) Int. Cl.
　　*C08K 7/24* (2006.01)
　　*C08K 3/22* (2006.01)

(52) U.S. Cl.
　　CPC .. *C01P 2004/61* (2013.01); *C08K 2003/2227* (2013.01)

(58) Field of Classification Search
　　CPC .............. C01P 2004/20; C01P 2004/51; C01P 2004/54; C01P 2004/61; C08K 2003/2227; C08K 2201/003; C08K 7/00; C08K 7/24; C09C 1/40
　　See application file for complete search history.

(56) References Cited

U.S. PATENT DOCUMENTS

| | | |
|---|---|---|
| 2010/0015445 A1 | 1/2010 | Lee et al. |
| 2019/0185675 A1 | 6/2019 | Yuan et al. |
| 2019/0296343 A1 | 9/2019 | Harada et al. |

FOREIGN PATENT DOCUMENTS

| | | |
|---|---|---|
| JP | 2016222501 A * | 12/2016 |
| JP | 2019-169343 A | 10/2019 |

OTHER PUBLICATIONS

P. Billik et al., "Mechanochemical-molten salt synthesis of α-Al2O3 platelets", Ceramics International, 2015, vol. 41, p. 8742-8747.

Frank R. Feret et al., "Determination of alpha and beta alumina in ceramic alumina by X-ray diffraction", Spectrochimica Acta Part B Atomic Spectroscopy, 2000, vol. 55, Issue 7, p. 1051-1061.

Zhigang Yang et al., "Preparation of textured porous Al2O3 ceramics by slip casting in a strong magnetic field and its mechanical properties", Crystal Research & Technology, vol. 50, No. 8, pp. 645-653 (Jun. 26, 2015).

International Search Report issued in corresponding International Patent Application No. PCT/CN2019/110122, dated Jun. 28, 2020.

* cited by examiner

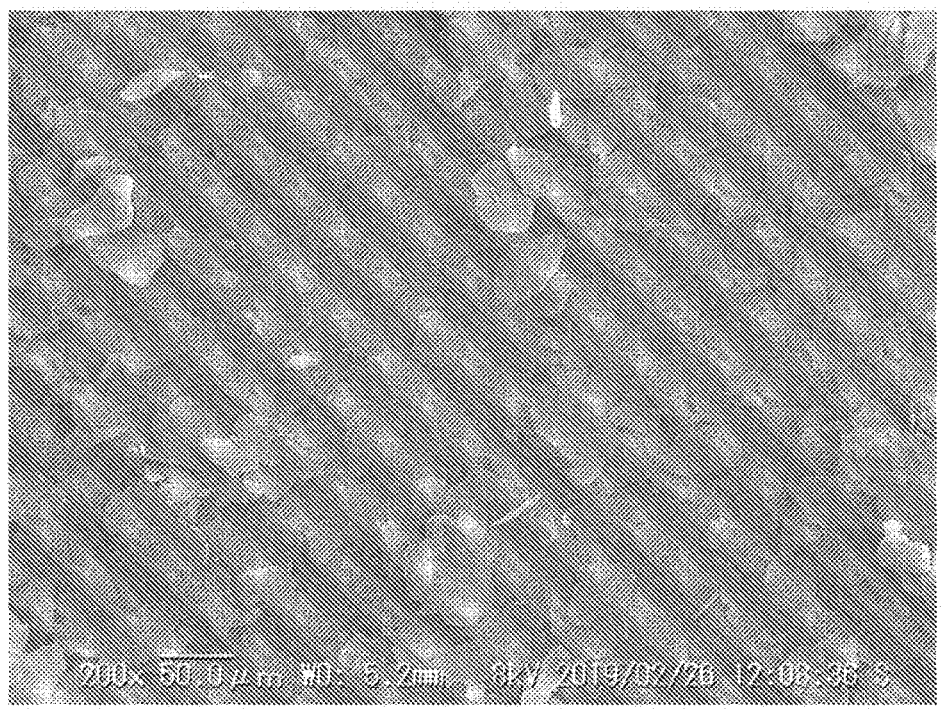

PLATE-LIKE ALUMINA PARTICLE AND METHOD FOR MANUFACTURING PLATE-LIKE ALUMINA PARTICLE

CROSS REFERENCE TO RELATED APPLICATIONS

This patent application is the U.S. National Phase under 35 U.S.C. § 371 of International Application No. PCT/CN2019/110122, filed on Oct. 9, 2019, the entire contents of each are hereby incorporated by reference in their entirety.

TECHNICAL FIELD

The present invention relates to a plate-like alumina particle and a method for manufacturing a plate-like alumina particle.

BACKGROUND ART

Alumina particles serving as inorganic fillers are used for various applications. In particular, plate-like alumina particles with a high aspect ratio have more excellent thermal characteristics, optical characteristics, and the like than spherical alumina particles, and further improvements in characteristics have been required.

In the related art, in order to improve the above-described characteristics that plate-like alumina particles intrinsically have, dispersibility, and the like, a variety of plate-like alumina particles having characteristics in shapes such as the major axis or the thickness are known (PTL 1 and PTL 2). In addition, as a method for controlling the shape for the purpose of increasing the aspect ratio of plate-like alumina particles, a method in which a hydrothermal synthesis is performed by adding a phosphoric acid compound as a shape-controlling agent (PTL 3), a method in which firing is performed after the addition of a silicofluoride (PTL 4), and the like are known.

Further, a method for manufacturing plate-like alumina in which silicon or a silicon compound including a silicon element is used as a crystal control agent in the manufacturing of the plate-like alumina (PTL 5) is also known.

CITATION LIST

Patent Literature

[PTL 1] Japanese Unexamined Patent Application Publication No. 2003-192338
[PTL 2] Japanese Unexamined Patent Application Publication No. 2002-249315
[PTL 3] Japanese Unexamined Patent Application Publication No. H9-59018
[PTL 4] Japanese Unexamined Patent Application Publication No. 2009-35430
[PTL 5] Japanese Unexamined Patent Application Publication No. 2016-222501

SUMMARY OF INVENTION

Technical Problem

However, regarding the brilliance of the plate-like alumina particle such as the case of intending to provide a bright pigment such as an effect pigment, there is still room for improvement.

The present invention has been made in consideration of the above-described circumstances, and an object of the present invention is to provide a plate-like alumina particle particularly having excellent brilliance.

Solution to Problem

As a result of intensive research for solving the above-described problems, the present inventors found that an alumina particle having a large value of I(006)/I(113) that is a ratio of a peak intensity I(006) at $2\theta=41.6\pm0.3$ degrees which corresponds to a (006) face to a peak intensity I(113) at $2\theta=43.3\pm0.3$ degrees which corresponds to a (113) face of diffraction peaks of the alumina particle obtained by X-ray diffraction measurement using a Cu-K$\alpha$ ray has excellent brilliance and completed the present invention. That is, the present invention has the following aspects.

[1] A plate-like alumina particle, in which a ratio I(006)/I(113) of a peak intensity I(006) to a peak intensity I(113) is 0.2 or more, the peak intensity I(006) is an intensity of a peak at $2\theta=41.6\pm0.3$ degrees which corresponds to a (006)-face diffraction peak obtained by X-ray diffraction measurement using a Cu-K$\alpha$ ray, and the peak intensity I(113) is an intensity of a peak at $2\theta=43.3\pm0.3$ degrees which corresponds to a (113)-face diffraction peak obtained by X-ray diffraction measurement using a Cu-K$\alpha$ ray.

[2] The plate-like alumina particle according to [1], in which the ratio I(006)/I(113) of the peak intensity I(006) to the peak intensity I(113) is 0.3 or more.

[3] The plate-like alumina particle according to [1] or [2], in which a thickness of the plate-like alumina particle is 0.1 µm or more.

[4] The plate-like alumina particle according to any one of [1] to [3], in which a $D_{50}$ value of the plate-like alumina particle is 20 µm or more.

[5] The plate-like alumina particle according to any one of [1] to [4], in which the plate-like alumina particle includes at least one element selected from the group consisting of silicon and germanium.

[6] The plate-like alumina particle according to any one of [1] to [5], in which the plate-like alumina particle includes molybdenum.

[7] The plate-like alumina particle according to any one of [1] to [6], in which the plate-like alumina particle includes mullite in a surface layer.

[8] A method for manufacturing the plate-like alumina particle according to any one of [1] to [7], the method including: mixing an aluminum compound including an aluminum element, a molybdenum compound including a molybdenum element, and a shape-controlling agent to produce a mixture; and firing the mixture.

[9] A method for manufacturing the plate-like alumina particle according to any one of [1] to [7], the method including: mixing an aluminum compound containing an aluminum element of 50% by mass or more in a form of $Al_2O_3$, a molybdenum compound containing a molybdenum element of 7% by mass or more and 40% by mass or less in a form of $MoO_3$, and a silicon compound containing silicon or a silicon element of 0.4% by mass or more and less than 10% by mass in a form of $SiO_2$ to produce a mixture; and firing the mixture, wherein each of the 50% by mass, the 7% by mass, the 40% by mass, and the 10% by mass is a mass percentage with respect to a total amount of raw materials in forms of oxides which is assumed to be 100% by mass.

[10] A method for manufacturing the plate-like alumina particle according to any one of [1] to [7], the method including: mixing an aluminum compound containing an aluminum element of 50% by mass or more in a form of $Al_2O_3$, a molybdenum compound containing a molybdenum element of 7% by mass or more and 40% by mass or less in a form of $MoO_3$, and a raw material germanium compound of 0.4% by mass or more and less than 1.5% by mass in a form of $GeO_2$ to produce a mixture; and firing the mixture, wherein each of the 50% by mass, the 7% by mass, the 40% by mass, the 0.4% by mass, and 1.5% by mass is a mass percentage with respect to a total amount of raw materials in forms of oxides which is assumed to be 100% by mass.

Advantageous Effects of Invention

According to the present invention, it is possible to provide a plate-like alumina particle having excellent brilliance.

BRIEF DESCRIPTION OF DRAWING

FIG. 1 is an SEM observation image of a plate-like alumina particle obtained in Example 1.

DESCRIPTION OF EMBODIMENTS

Hereinafter, a plate-like alumina particle and a method for manufacturing a plate-like alumina particle according to an embodiment of the present invention will be described in detail.
<Plate-Like Alumina Particle>

The plate-like alumina particle of the embodiment is an alumina particle, in which a ratio I(006)/I(113) of a peak intensity I(006) at 2θ=41.6±0.3 degrees which corresponds to a (006) face to a peak intensity I(113) at 2θ=43.3±0.3 degrees which corresponds to a (113) face of diffraction peaks obtained by X-ray diffraction measurement using a Cu-Kα ray (hereinafter, I(006)/I(113) will be abbreviated as the (006/113) ratio) is 0.2 or more. In addition, the plate-like alumina particle may include molybdenum. Further, the plate-like alumina particle may include an impurity from a raw material, a shape-controlling agent, and the like as long as the effect of the present invention is not impaired. The plate-like alumina particle of the embodiment may include mullite and/or a germanium compound in a surface layer. The plate-like alumina particle may further include an organic compound or the like.

In the plate-like alumina particle according to the embodiment, a value of the (006/113) ratio is 0.2 or more.

In the related art, the presence of a (006) face in α-alumina that is generally known is confirmed by X-ray diffraction, but the intensity of a diffraction peak derived from the (006) face is extremely small. For example, in the database of ICSD, in a case where the diffraction intensity of a (113) face of ordinary α-alumina is conjectured to be 100, the diffraction intensity of the (006) face is approximately 0.4. That is, it is found that the value of the (006/113) ratio is approximately 0.004 and crystal growth in an orientation of the (006) face is significantly small relative to crystal growth in an orientation of the (113) face.

However, the present inventors found that, from the plate-like alumina particle of the embodiment, a diffraction peak at 2θ=41.6±0.3 degrees which is recognized to correspond to the (006) face is detected and the peak intensity thereof is large. In addition, the present inventors found that as the value of a peak intensity corresponding to the (006) face increases, the value of a peak intensity of a diffraction peak at 2θ=43.3±0.3 degrees which is recognized to correspond to the (113) face decreases.

The value of the (006/113) ratio being large is understood to mean that the ratio of the (006) face to the (113) face is large and to mean that a face corresponding to a crystal in the orientation of the (006) face significantly develops in a flat plate-shaped alumina particle. Since not only such a flat plate-shaped alumina particle has a large area of an upper surface or a lower surface developed on a plate-like surface of the plate-like alumina, and as result, the visibility of reflected light reflected by the upper surface or the lower surface increases; but also the formation of a face corresponding to a crystal in the orientation of the (113) face is suppressed, high brilliance is exhibited in spite of a small mass per particle.

Brilliance being high means that the visibility of light reflected by the plate-like alumina particle is high at the time of observing the plate-like alumina particle. The visibility of light is considered to increase due to a high intensity of light (for example, crystallinity is high, and scattered reflection is suppressed) or an increase in an area of a reflection region per particle (for example, an increase in the size of a crystal face).

In the plate-like alumina particle according to the embodiment, from the viewpoint of brilliance, the value of the (006/113) ratio is 0.2 or more, preferably 0.3 or more, preferably 0.4 or more, preferably 0.5 or more, more preferably 1 or more, still more preferably 3 or more, and particularly preferably 7.5 or more.

The upper limit value of the value of the (006/113) ratio is not particularly limited and may be, as an example, 30 or less, 20 or less, or 10 or less.

The combination of the upper limit value and the lower limit value of the numerical range of the (006/113) ratio exemplified above can be set freely. The numerical range of the (006/113) ratio may be, as an example, 0.2 or more and 30 or less, 0.3 or more and 30 or less, 0.4 or more and 30 or less, 0.5 or more and 30 or less, 1 or more and 20 or less, 3 or more and 10 or less, or 7.5 or more and 10 or less.

The plate-like alumina particle of the embodiment, similar to the above-described viewpoint, has excellent brilliance due to its plate-like shape.

The shape of the plate-like alumina can be controlled by, for example, adjusting the mass percentage of a raw material aluminum compound, a raw material molybdenum compound, and a shape-controlling agent used.

The expression "plate-like" in the present invention refers to the fact that the aspect ratio obtained by dividing the average particle diameter of the alumina particle by the thickness is 2 or more. In the present specification, "the thickness of the alumina particle" refers to the arithmetic average value of the measured thicknesses of at least 50 plate-like alumina particles randomly selected from an image obtained by a scanning electron microscope (SEM). In addition, "the average particle diameter of the alumina particle" refers to a value computed as the volume-based median radius $D_{50}$ from a volume-based cumulative particle size distribution measured by a laser diffraction particle diameter measurement apparatus.

For the alumina particle of the embodiment, the conditions of the thickness, the particle diameter, and the aspect ratio described below can be combined in any manner as long as the alumina particle has a plate-like shape. In addition, the combination of the upper limit and the lower limit of a numerical range exemplified under these conditions can be set freely.

The thickness of the plate-like alumina particle according to the embodiment is preferably 0.1 μm or more, preferably 0.1 to 5 μm, more preferably 0.3 to 3 μm, and still more preferably 0.5 to 1 µm. The alumina particle having the above-described thickness is preferable due to the high aspect ratio and the excellent mechanical strength.

It is worthy of attention that the particle diameter of the plate-like alumina particle according to the embodiment tends to be significantly large since the value of the (006/113) ratio is large.

In the plate-like alumina particle according to the embodiment, the average particle diameter ($D_{50}$) is preferably 10 µm or more, more preferably 20 µm or more, more preferably 22 µm or more, still more preferably 25 µm or more, and particularly preferably 31 µm or more. The upper limit value of the average particle diameter is not particularly limited; however, as an example, the average particle diameter ($D_{50}$) of the plate-like alumina particle of the embodiment is preferably 10 to 500 µm, preferably 20 to 300 µm, more preferably 22 to 100 µm, still more preferably 25 to 100 µm, and particularly preferably 31 to 50 µm. An alumina particle having an average particle diameter ($D_{50}$) of the above-described lower limit value or more particularly has excellent brilliance since the area of a light reflection surface is large. In addition, an alumina particle having an average particle diameter ($D_{50}$) of the above-described upper limit value or less is optimal for the use as a filler.

In the plate-like alumina particle according to the embodiment, the particle diameter ($D_{10}$) is preferably 5 µm or more, more preferably 10 µm or more, and still more preferably 13 µm or more. The upper limit value of the particle diameter ($D_{10}$) is not particularly limited; however, as an example, the particle diameter ($D_{10}$) of the plate-like alumina particle of the embodiment is preferably 5 to 100 µm, more preferably 10 to 50 µm, and still more preferably 13 to 30 µm. An alumina particle having a particle diameter ($D_{10}$) of the above-described lower limit value or more particularly has excellent brilliance since the area of the light reflection surface is large, and the inhibition of reflection by a fine particle is reduced. In addition, an alumina particle having a particle diameter ($D_{10}$) of the above-described upper limit value or less is preferable for the use as a filler.

In the plate-like alumina particle according to the embodiment, the particle diameter ($D_{90}$) is preferably 20 µm or more, more preferably 40 µm or more, more preferably 46 µm or more, and still more preferably 52 µm or more. The upper limit value of the particle diameter ($D_{90}$) is not particularly limited; however, as an example, the particle diameter ($D_{90}$) of the plate-like alumina particle of the embodiment is preferably 20 to 700 µm, preferably 40 to 700 µm, more preferably 46 to 300 µm, and still more preferably 52 to 100 µm. An alumina particle having a particle diameter ($D_{90}$) of the above-described lower limit value or more particularly has excellent brilliance since the area of the light reflection surface is large. In addition, an alumina particle having a particle diameter ($D_{90}$) of the above-described upper limit value or less is preferable for the use as a filler.

In the plate-like alumina particle according to the embodiment, an aspect ratio that is a ratio of the particle diameter to the thickness is preferably 2 to 500, preferably 5 to 500, preferably 15 to 500, more preferably 33 to 300, and still more preferably 45 to 100. When the aspect ratio of the plate-like alumina particle is 2 or more, the plate-like alumina particle is capable of having a two-dimensional formulation characteristic, which is preferable, and, when the aspect ratio of the plate-like alumina particle is 500 or less, the mechanical strength is excellent, which is preferable. When the aspect ratio is 15 or more, the plate-like alumina particle becomes highly bright when used as a pigment, which is preferable.

The plate-like alumina particle according to the embodiment may have a disc shape or an oval plate shape, but the particle shape is preferably, for example, a polygonal plate shape from the viewpoint of handleability or ease in manufacturing.

The plate-like alumina particle according to the embodiment may be obtained by any kind of manufacturing method as long as the plate-like alumina particle satisfies only the above-described predetermined value of the (006/113) ratio, but is preferably obtained by firing an aluminum compound in the presence of a molybdenum compound and a shape-controlling agent from the viewpoint that the aspect ratio is higher, and dispersibility and productivity are further improved. As the shape-controlling agent, at least one kind selected from the group consisting of silicon, a silicon compound, and a germanium compound is preferably used. The shape-controlling agent serves as a Si supply source for mullite described below, and thus a silicon compound including silicon or a silicon element is more preferably used.

In the above-described manufacturing method, the molybdenum compound is used as a flux agent. Hereinafter, in the present specification, the manufacturing method in which the molybdenum compound is used as the flux agent will be simply referred to as a "flux method" in some cases. The flux method will be described below in detail. It is considered that, due to the firing, the molybdenum compound reacts with the aluminum compound at a high temperature and forms aluminum molybdate, and then the molybdenum compound is incorporated into the plate-like alumina particle while this aluminum molybdate is further decomposed into alumina and molybdenum oxide at a higher temperature. It is also possible to sublimate, collect, and reuse the molybdenum oxide.

In a case where the plate-like alumina particle of the embodiment includes mullite in the surface layer, the mullite is considered to be formed in the surface layer of the plate-like alumina particle by a reaction between the compound including silicon or a silicon element formulated as the shape-controlling agent and the aluminum compound through molybdenum in the above-described process. Regarding a generation mechanism of mullite, in more detail, it is considered that, on a plate surface of alumina, Mo—O-Si is formed by a reaction between molybdenum and a Si atom, and Mo—O—Al is formed by a reaction between molybdenum and an Al atom, and the firing at a high temperature desorbs Mo and forms mullite having a Si—O—Al bond.

Molybdenum oxide that is not incorporated into the plate-like aluminum particle is preferably collected and reused by sublimation. In such a case, it is possible to reduce the amount of molybdenum oxide being attached to the surface of the plate-like alumina, and as a result, it becomes possible to not to mix molybdenum oxide into a binder when dispersed into a medium to be dispersed such as an organic binder such as a resin or an inorganic binder such as glass, and to impart the intrinsic properties of plate-like alumina to the maximum extent.

In the present specification, a substance that can be sublimated and a substance that cannot be sublimated in a manufacturing method described below will be respectively called the flux agent and the shape-controlling agent.

Since an alumina particle has a high α crystallization rate and its own shape, the use of molybdenum and the shape-controlling agent in the manufacturing of the plate-like alumina particle enables the realization of excellent dispersibility, excellent mechanical strength, a high thermal conduction property, and brilliance.

In a case where the plate-like alumina particle of the embodiment includes mullite in the surface layer, the amount of the mullite generated in the surface layer of the plate-like alumina particle can be controlled by adjusting the percentages of the molybdenum compound and the shape-controlling agent. Particularly, the amount of the mullite generated in the surface layer of the plate-like alumina particle can be controlled by adjusting the percentage of the silicon compound including silicon or a silicon element that is used as the shape-controlling agent. A preferable value of the amount of the mullite generated in the surface layer of the plate-like alumina particle and a preferable percentage of the raw material used will be described below.

From the viewpoint of improving brilliance, the plate-like alumina particle of the embodiment is preferably a plate-like alumina particle having a high aspect ratio of 5 to 500, in which, in a solid state $^{27}$Al NMR analysis, a longitudinal relaxation time $T_1$ with respect to a peak of six-fold coordinated aluminum at 10 to 30 ppm at a strength of static magnetic field of 14.1 T is five seconds or longer.

The longitudinal relaxation time $T_1$ being five seconds or longer means that the crystallinity of the plate-like alumina particle is high. There is a report that, when the longitudinal relaxation time in a solid state is long, the symmetry of crystals is favorable, and the crystallinity is high (The report is "Susumu Kitagawa et al.: "Solutions of Polynuclear Species and Solid NMR" in Japan Society of Coordination Chemistry Library 4, Sankyo Shuppan Co., Ltd., pp 80 to 82).

In the plate-like alumina particle of the embodiment, the longitudinal relaxation time $T_1$ is preferably five seconds or longer, more preferably six seconds or longer, and still more preferably seven seconds or longer.

In the plate-like alumina particle of the embodiment, the upper limit value of the longitudinal relaxation time $T_1$ is not particularly limited and may be, for example, 22 seconds or shorter, 15 seconds or shorter, or 12 seconds or shorter.

An example of the numerical range of the longitudinal relaxation time $T_1$ exemplified above may be five seconds or longer and 22 seconds or shorter, six seconds or longer and 15 seconds or shorter, or seven seconds or longer and 12 seconds or shorter.

In the plate-like alumina particle of the embodiment, in a solid state $^{27}$Al NMR analysis, the peak of four-fold coordinated aluminum at 60 to 90 ppm at a strength of static magnetic field of 14.1 T is preferably not detected. Such a plate-like alumina particle is considered not to easily allow the occurrence of breakage or dropout originated from the distortion of the symmetry of crystals, which is due to the inclusion of crystals having different coordination numbers. Therefore, the plate-like alumina particle tends to be superior in terms of shape stability.

In the related art, it is common to evaluate the degree of crystallinity of an inorganic substance by using the result of an XRD analysis or the like. However, the present inventors found that an analysis result, which is obtained by using the longitudinal relaxation time $T_1$ as an index for the evaluation of the crystallinity of an alumina particle, has a better accuracy than that of an XRD analysis in the related art. For the plate-like alumina particle according to the embodiment, it can be said that the crystallinity of the alumina particle is high when the longitudinal relaxation time $T_1$ is five seconds or longer. That is, it is considered that since the plate-like alumina particle according to the embodiment probably has a high crystallinity, it is possible to improve light reflection by suppressing scattered reflection on a crystal face, and as a result, the plate-like alumina particle having excellent brilliance can be obtained.

Further, the present inventors found that the value of the longitudinal relaxation time $T_1$, the shape retention rate of the plate-like alumina particle, and the process stability of a resin composition extremely highly correlate with one another. When a resin composition is manufactured by formulating the plate-like alumina particle of the embodiment having a longitudinal relaxation time $T_1$ of five seconds or longer into a resin, the resin composition also has an advantage of a favorable process stability and ease in being processed into a desired shape. The plate-like alumina particle according to the embodiment has a long value as the longitudinal relaxation time $T_1$ and thus has a high crystallinity. Therefore, it is considered that, due to the high crystallinity of alumina, the strength of the particle is high, and, when the resin and the plate-like alumina particle are mixed together in a process for manufacturing the resin composition, a plate does not easily fracture, and, further, probably due to the high crystallinity of alumina, unevenness on the particle surface is slight, and the plate-like alumina particle is excellent in terms of adhesion to the resin.

For the above-described reasons, the plate-like alumina particle according to the embodiment is considered to provide a favorable process stability to a resin composition. According to the plate-like alumina particle of the embodiment, the intrinsic performance of the plate-like alumina particle is favorably exhibited even in the case of formulating the plate-like alumina particle into the resin composition or the like.

In the related art, it was more difficult to obtain an alumina particle having a high crystallinity from a plate-like alumina particle than a spherical alumina particle. This is considered to be because, for the plate-like alumina particle, unlike the spherical alumina particle, it is necessary to bias the orientation of crystal growth in the manufacturing process of the alumina particle.

In contrast, the plate-like alumina particle according to the embodiment which satisfies the value of the longitudinal relaxation time $T_1$ has a high crystallinity while having a plate-like shape. Therefore, the plate-like alumina particle is an extremely useful alumina particle having an advantage of a plate-like alumina particle such as the exhibition of an excellent thermal conduction property and, further, having a high shape retention rate and a favorable process stability of the resin composition.

The pH of the plate-like alumina particle according to the embodiment at an isoelectric point is, for example, in a range of 2 to 6, preferably in a range of 2.5 to 5, and more preferably in a range of 3 to 4. The plate-like alumina particle having a pH at the isoelectric point in the above-described range has a strong electrostatic repulsive force, is capable of enhancing dispersion stability at the time of being formulated into the above-described medium to be dispersed, and further facilitates reforming by a surface treatment by a coupling treatment agent which is intended to further improve performance.

The value of the pH at the isoelectric point can be obtained by (i) preparing a sample for measurement by obtaining a supernatant liquid of a mixture which is obtained by stirring a sample (20 mg) and a 10 mM KCL aqueous solution (10 mL) for three minutes in a stirring and defoaming mode using an AWATORI RENTARO (Thinky Corporation, ARE-310), and leaving the mixture to stand for five minutes; (ii) measuring a zeta potential (applied voltage of 100 V, Monomodal mode) in a pH range of up to 2 in a zeta potential measurement apparatus (Malvern Panalytical Ltd., ZETASIZER NANO ZSP) by adding 0.1 N HCl to the sample by an automatic titration apparatus; and (iii) evaluating the pH at the isoelectric point at which the potential reaches zero.

In the plate-like alumina particle according to the embodiment, for example, the density is 3.70 g/cm$^3$ or more and 4.10 g/cm$^3$ or less, the density is preferably 3.72 g/cm$^3$ or more and 4.10 g/cm$^3$ or less, and the density is more preferably 3.80 g/cm$^3$ or more and 4.10 g/cm$^3$ or less.

The density can be measured by using a dry-type automatic density meter AccuPyc II 1330 produced by MICROMERITICS INSTRUMENT CORP. under the conditions of a measurement temperature of 25° C. and the use of helium as a carrier gas after a pretreatment of the plate-like alumina particle is performed under the conditions of 300° C. and three hours.

[Alumina]

"Alumina" included in the plate-like alumina particle according to the embodiment is aluminum oxide and may be transition alumina in a variety of crystal forms of, for example, γ, δ, θ, k, or the like or may include an alumina hydrate in transition alumina. However, alumina preferably has, basically, an α-crystal form (α-type) from the viewpoint of further improved mechanical strength or optical characteristics. The α-crystal form is a dense crystal structure of alumina and is advantageous in improving the mechanical strength or optical characteristics of the plate-like alumina of the embodiment.

An α crystallization rate is preferably as close to 100% as possible since it becomes easy to exhibit the intrinsic properties of the α-crystal form. The α crystallization rate of the plate-like alumina particle according to the embodiment is, for example, 90% or more, preferably 95% or more, and more preferably 99% or more.

[Silicon and Germanium]

The plate-like alumina particle according to the embodiment may include silicon and/or germanium.

The silicon or germanium may be derived from silicon, a silicon compound, and/or a germanium compound that can be used as the shape-controlling agent. In the case of using the silicon or germanium, in the manufacturing method described below, it is possible to manufacture a plate-like alumina particle having excellent brilliance.

(Silicon)

The plate-like alumina particle according to the embodiment may include silicon. The plate-like alumina particle according to the embodiment may contain silicon in the surface layer.

In this regard, "surface layer" means a layer within 10 nm from the surface of the plate-like alumina particle according to the embodiment. This distance corresponds to the detection depth of XPS used for the measurement in the example.

In the plate-like alumina particle according to the embodiment, silicon may be unevenly distributed in the surface layer. In this regard, "being unevenly distributed in the surface layer" means a state in which the mass of silicon per unit volume of the surface layer is greater than the mass of silicon per unit volume of the portion other than the surface layer. Uneven distribution of silicon in the surface layer can be identified by comparing the result of surface analysis based on XPS and the result of overall analysis based on XRF.

Silicon contained in the plate-like alumina particle according to the embodiment may be a silicon simple substance or be silicon in the silicon compound. The plate-like alumina particle according to the embodiment may contain at least one selected from a group consisting of mullite, Si, SiO$_2$, SiO, and aluminum silicate produced by reacting with alumina as the silicon or silicon compound, and the above-described substance may be included in the surface layer. Mullite will be described below.

In the case of using silicon or a silicon compound including a silicon element as the shape-controlling agent, from the plate-like alumina particle according to the embodiment, Si can be detected by an XRF analysis. In the plate-like alumina particle according to the embodiment, the molar ratio [Si]/[Al] of Si to Al acquired by an XRF analysis is, for example, 0.04 or less, preferably 0.035 or less, and more preferably 0.02 or less.

In addition, the value of the molar ratio [Si]/[Al] is not particularly limited and is, for example, 0.003 or more, preferably 0.004 or more, and more preferably 0.005 or more.

In the plate-like alumina particle according to the embodiment, the molar ratio [Si]/[Al] of Si to Al acquired by an XRF analysis is, for example, 0.003 or more and 0.04 or less, preferably 0.004 or more and 0.035 or less, and more preferably 0.005 or more and 0.02 or less.

A plate-like alumina particle having a value of the molar ratio [Si]/[Al] of Si to Al acquired by an XRF analysis in the above-described range satisfies the above-described value of the (006/113) ratio and has more preferable brilliance, and the plate-like shape is favorably formed. In addition, an attachment substance is not easily attached to the surface of the plate-like alumina particle, and the quality is excellent. This attachment substance is regarded as a SiO$_2$ grain and is considered to be generated from Si that becomes excessive due to the saturation of the generation of mullite in the surface layer of the plate-like alumina particle.

The plate-like alumina particle according to the embodiment is capable of including silicon that corresponds to the silicon compound including silicon or a silicon element which is used in the manufacturing method thereof. The content of silicon relative to 100% by mass of the plate-like alumina particle according to the embodiment is preferably 10% by mass or less, more preferably 0.001% to 5% by mass, still more preferably 0.01% to 4% by mass, and particularly preferably 0.3% to 2.5% by mass in a form of silicon dioxide. When the content of silicon is in the above-described range, the plate-like alumina particle satisfies the above-described value of the (006/113) ratio and has more preferable brilliance, and the plate-like shape is favorably formed. In addition, the attachment substance regarded as a SiO$_2$ grain is not easily attached to the surface of the plate-like alumina particle, and the quality is excellent. The content of the silicon can be obtained by an XRF analysis.

(Mullite)

The plate-like alumina particle according to the embodiment may include mullite. When mullite is included in the surface layer, the plate-like alumina particle can be made to be more restrained from wearing apparatuses than a plate-like alumina particle in the related art. Alumina is a substance having a Mohs hardness of nine and is classified as an extremely hard substance. Therefore, the plate-like alumina particle in the related art had a problem of wearing an apparatus used for the manufacturing of a product including the plate-like alumina particle or the like. The Mohs hardness of mullite is 7.5. Therefore, in a case where the plate-like alumina particle according to the embodiment includes mullite in the surface layer, an apparatus comes into contact with the mullite on the surface rather than alumina of the plate-like alumina particle, and it is possible to reduce the wear of the apparatus.

When mullite is included in the surface layer of the plate-like alumina particle, a significant wear reduction of an apparatus is developed. "Mullite" that the plate-like alumina particle according to the embodiment may include in the surface layer is a composite oxide of Al and Si and represented by $Al_xSi_yO_z$, but the values of x, y, and z are not particularly limited. A more preferable range is $Al_2Si_1O_5$ to $Al_6Si_2O_{13}$. In the examples described below, the XRD peak intensities of plate-like alumina particles including $Al_{2.85}Si_1O_{6.3}$, $Al_3Si_1O_{6.5}$, $Al_{3.67}Si_1O_{7.5}$, $Al_4Si_1O_8$, or $Al_6Si_2O_{13}$ are confirmed. The plate-like alumina particle according to the embodiment may include at least one kind of compound selected from the group consisting of $Al_{2.85}Si_1O_{6.3}$, $Al_3Si_1O_{6.5}$, $Al_{3.67}Si_1O_{7.5}$, $Al_4Si_1O_8$, and $Al_6Si_2O_{13}$ in the surface layer. Here, the "surface layer" refers to a region 10 nm or less from the surface of the plate-like alumina particle according to the embodiment. This distance corresponds to the detection depth of XPS used for measurement in the examples. This mullite surface layer is a layer as extremely thin as 10 nm or less, and, when the number of defects or the like of a mullite crystal in a surface and an interface increases, the hardness of the mullite surface layer becomes lower than the intrinsic Mohs hardness (7.5) of mullite, and, further, mullite is capable of significantly reducing the wear of an apparatus more than mullite including no or a small number of crystal defects.

In the plate-like alumina particle according to the embodiment, the mullite is preferably unevenly distributed in the surface layer. Here, the expression "unevenly distributed in the surface layer" refers to a state in which the mass of mullite per unit volume in the surface layer is greater than the mass of mullite per unit volume in a region except for the surface layer. Mullite being unevenly distributed in the surface layer can be determined by comparing the results of a surface analysis by XPS and an overall analysis by XRF as described in the examples described below. In a case where mullite is made to be unevenly distributed in the surface layer, it is possible to reduce the wear property of an apparatus, which is based on mullite, to the same extent in a smaller amount than in a case where mullite is made to be present not only in the surface layer but also in a region except for the surface layer (inner layer).

In the plate-like alumina particle according to the embodiment, as the shape-controlling agent, a silicon compound including silicon or a silicon element is used, and, in the case of including mullite in the surface layer, Si is detected by an XPS analysis. In a case where the plate-like alumina particle according to the embodiment includes mullite, the value of the molar ratio [Si]/[Al] of Si to Al acquired by an XRF analysis is preferably 0.15 or more, more preferably 0.20 or more, and still more preferably 0.25 or more. According to the result of XPS, as the amount of $SiO_2$ prepared in the raw material increases, the value of [Si]/[Al] increases, but there is a case where the value hits a peak at a certain degree. This is considered to mean that the amount of Si on the plate-like alumina particle is saturated. Therefore, a plate-like alumina particle having a value of the molar ratio [Si]/[Al] being 0.20 or more, particularly, 0.25 or more is considered to be in a state in which the surface is coated with mullite. In the above-described coated state, all of the surface of the plate-like alumina particle may be coated with mullite or at least a part of the surface of the plate-like alumina particle may be coated with mullite.

The upper limit of the value of the molar ratio [Si]/[Al] is not particularly limited, but is preferably 0.4 or less, more preferably 0.35 or less, and still more preferably 0.3 or less.

In the plate-like alumina particle according to the embodiment, the value of the molar ratio [Si]/[Al] of Si to Al acquired by an XRF analysis is preferably 0.15 or more and 0.4 or less, more preferably 0.20 or more and 0.35 or less, and still more preferably 0.25 or more and 0.3 or less.

In a plate-like alumina particle having a value of the molar ratio [Si]/[Al] of Si to Al acquired by an XRF analysis in the above-described range, the amount of mullite included in the surface layer is appropriate, the quality is excellent, and the effect for reducing the wear of an apparatus is further improved.

The XRD analysis is performed under the same condition as a measurement condition described in the examples described below or under a compatible condition under which the same measurement result can be obtained.

In the present embodiment, in a method for manufacturing the plate-like alumina described below, the prepared silicon compound including silicon or a silicon element such as $SiO_2$ is converted to mullite at a high efficiency, whereby plate-like alumina having an excellent quality can be obtained.

From the plate-like alumina particle according to the embodiment including mullite, a diffraction peak derived from the mullite is detected by an XRD analysis. This mullite-derived diffraction peak can be clearly differentiated from the diffraction peak of the silicon compound including silicon or a silicon element, for example, $SiO_2$ or the like. In the plate-like alumina particle according to the embodiment, the ratio of the peak intensity of mullite that is recognized at 2θ of 26.2±0.2° to the peak intensity of a (104) face of α-alumina that is recognized at 2θ of 35.1±0.2° may be, for example, 0.02 or more, 0.05 or more, or 0.1 or more.

The upper limit of the value of the ratio between peak intensities is not particularly limited and is, for example, 0.3 or less, preferably 0.2 or less, and more preferably less than 0.12.

In the plate-like alumina particle according to the embodiment, the ratio of the peak intensity of mullite that is recognized at 2θ of 26.2±0.2° to the peak intensity of the (104) face of α-alumina that is recognized at 2θ of 35.1±0.2° may be, for example, 0.02 or more and 0.3 or less, 0.05 or more and 0.2 or less, or 0.1 or more and less than 0.12.

In a plate-like alumina particle having a value of the ratio between peak intensities in the above-described range, the amount of mullite is appropriate, the quality is excellent, and the effect for reducing the wear of an apparatus is further improved.

The XRD analysis is performed under the same condition as a measurement condition described in the examples described below or under a compatible condition under which the same measurement result can be obtained.

In the plate-like alumina particle according to the embodiment including mullite, Si is detected by an XPS analysis.

The value of the molar ratio [Si]/[Al] acquired by an XRF analysis may be a value exemplified above, and, in a plate-like alumina particle having a value of the molar ratio [Si]/[Al] in the above-described range, the amount of mullite is appropriate, the quality is excellent, and the effect for reducing the wear of an apparatus is further improved.

The plate-like alumina particle according to the embodiment includes silicon that corresponds to mullite based on the silicon compound including silicon or a silicon element which is used in the manufacturing method thereof. The content of silicon relative to 100% by mass of the plate-like alumina particle according to the embodiment may be a value exemplified above, and the content of silicon is preferably in the above-described range since the amount of mullite is appropriate. The content of the silicon can be obtained by an XRF analysis.

The XRD analysis is performed under the same condition as a measurement condition described in the examples described below or under a compatible condition under which the same measurement result can be obtained.

In addition, mullite in the surface layer may form a mullite layer or may be in a state in which mullite and alumina are present in a mixed form. The interface between mullite and alumina in the surface layer may be in a state in which mullite and alumina are physically in contact with each other or mullite and alumina may form a chemical bond such as Si—O—Al. Regarding the combination of alumina and $SiO_2$, from the viewpoint of a high similarity in the configurational atomic composition or, in the case of employing the flux method, the ease in forming the chemical bond such as Si—O—Al based on the flux method, the combination including alumina and mullite as the essential components can be made so that alumina and mullite are more strongly bound together and are not easily peeled off from each other. Therefore, as long as the amount of Si is on the same level, the combination including alumina and mullite as the essential components enables the plate-like alumina particle to be more restrained from wearing an apparatus for a longer period of time, which is more preferable. A technical effect of the combination including alumina and mullite as the essential components can be expected not only for a combination of alumina and mullite but also for a combination of alumina, mullite, and silica; however, between both combinations, the level of the technical effect becomes stronger in the former two-element combination.

(Germanium)

The plate-like alumina particle according to the embodiment may include germanium. The plate-like alumina particle according to the embodiment may include the germanium in the surface layer.

While varying depending on a raw material to be used, the plate-like alumina particle according to the embodiment may include, as the germanium or germanium compound, at least one kind selected from the group consisting of, for example, compounds such as Ge, $GeO_2$, GeO, $GeCl_2$, $GeBr_4$, $GeI_4$, $GeS_2$, AlGe, GeTe, $GeTe_3$, $As_2$, GeSe, $GeS_3As$, SiGe, $Li_2Ge$, FeGe, SrGe, and GaGe, oxides thereof, and the like and may include the above-described substance in the surface layer. The present inventors confirmed an XRD peak including $GeO_2$ from the plate-like alumina particle of the embodiment in which the germanium compound is used as a raw material.

The "germanium or germanium compound" that the plate-like alumina particle according to the embodiment includes and a "raw material germanium compound" that is used as the shape-controlling agent of the raw material may be the same kind of germanium compound. For example, from a plate-like alumina particle manufactured by the addition of $GeO_2$ to a raw material, $GeO_2$ may be detected.

The plate-like alumina particle according to the embodiment may include germanium or a germanium compound in the surface layer. When the germanium or germanium compound is included in the surface layer, the plate-like alumina particle can be made to be more restrained from wearing an apparatus than a plate-like alumina particle in the related art. Alumina is a substance having a Mohs hardness of nine and is classified as an extremely hard substance.

Therefore, the plate-like alumina particle in the related art had a problem of wearing an apparatus used for the manufacturing of a product including the plate-like alumina particle or the like. The Mohs hardness of germanium or a germanium compound, for example, germanium dioxide ($GeO_2$) is approximately six, and, when including germanium or a germanium compound, the plate-like alumina particle according to the embodiment is capable of reducing the wear of an apparatus. Further, when the plate-like alumina particle according to the embodiment includes germanium or a germanium compound in the surface layer, an apparatus comes into contact with the germanium or germanium compound on the surface rather than alumina of the plate-like alumina particle, and it is possible to further reduce the wear of the apparatus.

When germanium or a germanium compound is included in the surface layer of the plate-like alumina particle, a significant wear reduction of an apparatus is developed. Here, the "surface layer" refers to a region 10 nm or less from the surface of the plate-like alumina particle according to the embodiment. Further, this surface layer including germanium becomes a layer as extremely thin as 10 nm or less, and, for example, in a case where the germanium is germanium dioxide, when the number of defects or the like of the germanium dioxide structure in a surface and an interface increases, the hardness of the germanium dioxide becomes lower than the intrinsic Mohs hardness (6.0), and, further, the germanium dioxide is capable of significantly reducing the wear of an apparatus more than germanium dioxide including no or a small number of structural defects.

In the plate-like alumina particle according to the embodiment, the germanium or germanium compound is preferably unevenly distributed in the surface layer. Here, the expression "unevenly distributed in the surface layer" refers to a state in which the mass of the germanium or germanium compound per unit volume in the surface layer is greater than the mass of the germanium or germanium compound per unit volume in a region except for the surface layer. The germanium or germanium compound being unevenly distributed in the surface layer can be determined by comparing the results of a surface analysis by XPS and an overall analysis by XRF as described in the examples described below. In a case where germanium or a germanium compound is made to be unevenly distributed in the surface layer, it is possible to reduce the wear property of an apparatus, which is based on the germanium or germanium compound, to the same extent in a smaller amount than in a case where germanium or a germanium compound is made to be present not only in the surface layer but also in a region except for the surface layer (inner layer).

In a case where the plate-like alumina particle according to the embodiment includes germanium or a germanium compound in the surface layer, Ge is detected by an XPS analysis. In the plate-like alumina particle according to the embodiment, the value of the molar ratio [Ge]/[Al] of Ge to Al acquired by an XRF analysis is preferably 0.005 or more, more preferably 0.01 or more, still more preferably 0.02 or more, and particularly preferably 0.03 or more. An increase in the amount of $GeO_2$ prepared in the raw material increases the value of [Ge]/[Al], but there is a case where the value hits a peak at a certain degree. This is considered to mean that the amount of Ge on the plate-like alumina particle is saturated. Therefore, a plate-like alumina particle having a value of the molar ratio [Ge]/[Al] being 0.12 or more, particularly, 0.13 or more is considered to be in a state in which the surface is coated with germanium or a germanium compound. In the above-described coated state, all of the surface of the plate-like alumina particle may be coated with germanium or a germanium compound or at least a part of the surface of the plate-like alumina particle may be coated with germanium or a germanium compound.

The upper limit of the value of the molar ratio [Ge]/[Al] in the XPS analysis is not particularly limited and may be 0.3 or less, 0.25 or less, 0.2 or less, 0.17 or less, or 0.1 or less.

In the plate-like alumina particle according to the embodiment, the value of the molar ratio [Ge]/[Al] of Ge to Al acquired by an XRF analysis may be 0.005 or more and 0.3 or less, 0.005 or more and 0.25 or less, 0.01 or more and 0.2 or less, 0.02 or more and 0.17 or less, or 0.03 or more and 0.1 or less.

In a plate-like alumina particle having a value of the molar ratio [Ge]/[Al] of Ge to Al acquired by an XRF analysis in the above-described range, the amount of germanium or a germanium compound included in the surface layer is appropriate, the value of the (006/113) ratio is satisfied, brilliance becomes more favorable, a plate-like shape is more favorably formed, the quality is excellent, and the effect for reducing the wear of an apparatus is further improved.

The XRD analysis is performed under the same condition as a measurement condition described in the examples described below or under a compatible condition under which the same measurement result can be obtained.

In the present embodiment, in a method for manufacturing the plate-like alumina described below, the raw material germanium compound such as $GeO_2$ prepared as the shape-controlling agent forms a layer including germanium in the surface layer of the plate-like alumina particle at a high efficiency, whereby plate-like alumina having an excellent quality can be obtained.

In the case of using the germanium compound as the shape-controlling agent, Ge can be detected by an XRF analysis from the plate-like alumina particle according to the embodiment. In the plate-like alumina particle according to the embodiment, the molar ratio [Ge]/[Al] of Ge to Al acquired by an XRF analysis is, for example, 0.08 or less, preferably 0.05 or less, and more preferably 0.03 or less.

In addition, the value of the molar ratio [Ge]/[Al] is not particularly limited and is, for example, 0.0005 or more, preferably 0.001 or more, and more preferably 0.0015 or more.

In the plate-like alumina particle according to the embodiment, the molar ratio [Ge]/[Al] of Ge to Al acquired by an XRF analysis is, for example, 0.0005 or more and 0.08 or less, preferably 0.001 or more and 0.05 or less, and more preferably 0.0015 or more and 0.03 or less.

In a plate-like alumina particle having a value of the molar ratio [Ge]/[Al] of Ge to Al acquired by an XRF analysis in the above-described range, the amount of germanium or a germanium compound included is appropriate, the value of the (006/113) ratio is satisfied, brilliance becomes more favorable, a plate-like shape is more favorably formed, the quality is excellent, and the effect for reducing the wear of an apparatus is further improved.

The plate-like alumina particle according to the embodiment includes germanium that corresponds to the raw material germanium compound which is used in the manufacturing method thereof. The content of the germanium relative to 100% by mass of the plate-like alumina particle according to the embodiment is preferably 10% by mass or less, more preferably 0.001% to 5% by mass, still more preferably 0.01% to 4% by mass, and particularly preferably 0.1% to 3.0%. The content of the germanium is preferably in the above-described range since the amount of germanium or a germanium compound included is appropriate, the value of the (006/113) ratio is satisfied, and brilliance becomes more favorable. The content of the germanium can be obtained by an XRF analysis.

The XRF analysis is performed under the same condition as a measurement condition described in the examples described below or under a compatible condition under which the same measurement result can be obtained.

In addition, the germanium or germanium compound in the surface layer may form a mullite layer or may be in a state in which the germanium or germanium compound and alumina are present in a mixed form. The interface between the germanium or germanium compound and alumina in the surface layer may be in a state in which the germanium or germanium compound and alumina are physically in contact with each other or the germanium or germanium compound and alumina may form a chemical bond such as Ge—O—Al.

[Molybdenum]

In addition, the plate-like alumina particle according to the embodiment may include molybdenum. The molybdenum may be derived from a molybdenum compound used as the flux agent.

Molybdenum has a catalytic function and an optical function. In addition, the use of molybdenum enables the manufacturing of a plate-like alumina particle having a plate-like shape, a high crystallinity, and excellent brilliance in the manufacturing method described below. There is a tendency that, when the amount of molybdenum used is increased, the particle size and the value of the (006/113) ratio are satisfied, and the brilliance of the obtained alumina particle becomes further improved. Further, the use of molybdenum accelerates the formation of mullite and enables the manufacturing of a plate-like alumina particle having a high aspect ratio and excellent dispersibility. In addition, it becomes possible to apply the plate-like alumina particle to applications as an oxidation reaction catalyst and an optical material by using the characteristics of molybdenum included in the plate-like alumina particle.

The molybdenum is not particularly limited, and not only molybdenum metal but also molybdenum oxide, a partially reduced molybdenum compound, molybdate, or the like are included. Molybdenum may be included in any of multiple forms or a combination that a molybdenum compound is capable of having and may be included in the plate-like alumina particle as $\alpha$-$MoO_3$, $\beta$-$MoO_3$, $MoO_2$, MoO, a molybdenum cluster structure, or the like.

The form of molybdenum being contained is not particularly limited, and molybdenum may be contained in the form of being attached to the surface of the plate-like alumina particle, in the form of being substituted into part of aluminum in the crystal structure of alumina, or in a combined form thereof.

The content of molybdenum relative to 100% by mass of the plate-like alumina particle according to the embodiment is preferably 10% by mass or less in a form of molybdenum trioxide and is more preferably set to 0.001% to 5% by mass, still more preferably set to 0.01% to 5% by mass, and particularly preferably set to 0.1% to 1.2% by mass by adjusting the firing temperature, the firing time, and the sublimation rate of the molybdenum compound. The content of molybdenum is preferably 10% by mass or less since the quality of $\alpha$-single crystal of alumina is improved.

The content of the molybdenum can be obtained by an XRF analysis. The XRF analysis is performed under the same condition as a measurement condition described in the examples described below or under a compatible condition under which the same measurement result can be obtained.

[Organic Compound]

In an embodiment, the plate-like alumina particle may include an organic compound. The organic compound is present on the surface of the plate-like alumina particle and has a function of adjusting the surface property of the plate-like alumina particle. For example, the plate-like alumina particle including the organic compound on the surface improves affinity to a resin and is thus capable of developing the function of the plate-like alumina particle to the maximum extent as a filler.

The organic compound is not particularly limited, and organosilanes, alkylphosphonic acid, and polymers are exemplified.

Examples of the organosilane include alkyltrimethoxysilanes or alkyltrichlorosilanes having a carbon number of an alkyl group of 1 to 22 such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, 3,3,3-trifluoropropyltrimethoxysilane, (tridecafluoro-1,1,2, 2-tetrahydrooctyl)trichlorosilanes, phenyltrimethoxysilane, phenyltriethoxysilane, p-chloromethylphenyltrimethoxysilane, and p-chloromethylphenyltriethoxysilanes.

Examples of the phosphonic acid include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzenephosphonic acid.

Regarding the polymer, for example, poly(meth)acrylates are suitable for use. Specific examples of the polymer include polymethyl(meth)acrylate, polyethyl(meth)acrylate, polybutyl(meth)acrylate, polybenzyl(meth)acrylate, polycyclohexyl(meth)acrylate, poly(t-butyl(meth)acrylate), polyglycidyl(meth)acrylate, and polypentafluoropropyl (meth)acrylate. In addition, general-purpose polymers, for example, polystyrene, polyvinyl chloride, polyvinyl acetate, an epoxy resin, polyester, polyimide, and polycarbonate may be included.

The organic compound may be included singly or two or more kinds may be included.

The form of the organic compound being contained is not particularly limited, and the organic compound may be linked to alumina by a covalent bond or may coat alumina.

The content rate of the organic compound is preferably 20% by mass or less and more preferably 10% to 0.01% by mass of the mass of the plate-like alumina particle. The content rate of the organic compound is preferably 20% by mass or less since physical properties derived from the plate-like alumina particle can be easily developed.

<Method for Manufacturing Plate-Like Alumina Particle>

The method for manufacturing the plate-like alumina particle of the embodiment is not particularly limited, and a well-known technique can be appropriately applied, but a manufacturing method by the flux method in which a molybdenum compound is used can be preferably applied since it is possible to preferably control alumina having a high α-crystallization rate at a relatively low temperature.

In more detail, a preferable method for manufacturing the plate-like alumina particle includes a step (firing step) of firing an aluminum compound in the presence of a molybdenum compound and a shaping controlling agent. The firing step may be a step of firing a mixture obtained in a step (mixing step) of obtaining a mixture that is a firing subject.

[Mixing Step]

The mixing step is a step of mixing an aluminum compound, a molybdenum compound, and a shape-controlling agent to produce the mixture. Hereinafter, the content of the mixture will be described below.

(Aluminum Compound)

The aluminum compound in the present embodiment is a compound including an aluminum element and a raw material of the plate-like alumina particle according to the embodiment. The aluminum compound is not particularly limited as long as the aluminum compound is turned into an alumna particle by a heat treatment, and it is possible to use, for example, aluminum chloride, aluminum sulfate, basic aluminum acetate, aluminum hydroxide, boehmite, pseudo-boehmite, transition alumina (γ-alumina, δ-alumina, θ-alumina, or the like), α-alumina, mixed alumina having two or more kinds of crystal phases, or the like, and the physical forms such as shape, particle diameter, and specific surface area of the aluminum compound as a precursor are not particularly limited.

According to the flux method described in detail below, it is possible to preferably use the aluminum compound regardless of the shape of the aluminum compound in the embodiment such as any one of a spherical structure, an irregular shape, a structure having a high aspect ratio (for example, a wire, a fiber, a ribbon, a tube, or the like), a sheet, and the like.

Similarly, according to the flux method described in detail below, regarding the particle diameter of the aluminum compound, it is possible to preferably use a solid of the aluminum compound having a particle diameter of several nanometers to several hundreds of micrometers.

The specific surface area of the aluminum compound is not particularly limited. The specific surface area is preferably large in order for the molybdenum compound to act effectively, but the aluminum compound can be used as a raw material regardless of the specific surface area by adjusting a firing condition or the amount of the molybdenum compound used.

In addition, the aluminum compound may be the aluminum compound alone or a composite body of the aluminum compound and the organic compound. For example, an organic/inorganic composite body obtained by modifying the aluminum compound by using an organosilane, an aluminum compound composite body to which a polymer is adsorbed, and the like can also be preferably used. In the case of using these composite bodies, the content rate of the organic compound is not particularly limited, and the content rate is preferably 60% by mass or less and more preferably 30% by mass or less since it is possible to efficiently manufacture the plate-like alumina particle.

(Shape-Controlling Agent)

A shape-controlling agent can be used in order to form the plate-like alumina particle according to the embodiment. The shape-controlling agent plays an important role in the plate-like crystal growth of alumina by firing the alumina compound in the presence of the molybdenum compound.

The presence state of the shape-controlling agent is not particularly limited, and it is possible to preferably use a physical mixture of the shape-controlling agent and the aluminum compound, a composite body including the shape-controlling agent uniformly or locally present on the surface or inside of the aluminum compound, and the like.

In addition, the shape-controlling agent may be added to the aluminum compound and may be included in the aluminum compound as an impurity.

The shape-controlling agent plays an important role in plate-like crystal growth. In a molybdenum oxide flux method that is performed ordinarily, molybdenum oxide reacts with the aluminum compound, thereby forming aluminum molybdate, and then, in a decomposition process of this aluminum molybdate, a change in chemical potential serves as a driving force for crystallization, and thus a hexagonal bipyramid-type polyhedral particle in which a euhedral face (113) has developed is formed. It is considered that, in the manufacturing method of the embodiment, the shape-controlling agent is localized near the surface of the particle in an α-alumina growth process, thereby significantly inhibiting the growth of the euhedral face (113), and, consequently, the growth of a crystal orientation in a face direction becomes relatively fast, a (001) face or the (006) face grows, and a plate-like form can be formed. A plate-like alumina particle including molybdenum can be more easily formed by using the molybdenum compound as the flux agent.

The above-described mechanism is simply conjectured, and even a case where the effect of the present invention can be obtained by a mechanism different from the above-described mechanism is also included in the technical scope of the present invention.

Regarding the kind of the shape-controlling agent, at least one kind selected from the group consisting of silicon, a silicon compound, and a germanium compound is preferably used since it is possible to manufacture a plate-like alumina particle having a higher aspect ratio, and further improved dispersibility and productivity. Silicon or a silicon compound and a germanium compound can be jointly used. A silicon compound including silicon or a silicon element is preferably used as the shape-controlling agent since the silicon compound serves as a Si supply source for mullite and mullite can be efficiently produced. In addition, a germanium compound is preferably used as the shape-controlling agent since it is possible to manufacture a plate-like silica particle having a higher aspect ratio and a larger particle diameter than in the case of using silicon or a silicon compound.

A plate-like alumina particle including mullite in the surface layer can be easily manufactured by the flux method in which silicon or a silicon compound is used as the shape-controlling agent.

A plate-like alumina particle including germanium or a germanium compound can be easily manufactured by the flux method in which the raw material germanium compound is used as the shape-controlling agent.

Silicon or Silicon Compound

The silicon compound including silicon or a silicon element is not particularly limited, and a well-known silicon compound can be used. As specific examples of the silicon compound including silicon or a silicon element, artificial synthetic silicon compounds such as silicon metal, an organosilane, a silicon resin, a silicon fine particle, a silica gel, mesoporous silica, SiC, and mullite; and natural silicon compounds such as biosilica; and the like are exemplified. Among these, an organosilane, a silicon resin, and a silicon fine particle are preferably used since it is possible to more uniformly form the composition and mix with the aluminum compound. The silicon compound including silicon or a silicon element may be used singly or two or more kinds may be used in combination. In addition, the shape-controlling agent may be jointly used with another shape-controlling agent as long as the effect in the present invention is not impaired.

The shape of the silicon compound including silicon or a silicon element is not particularly limited, and it is possible to preferably use, for example, a spherical structure, an irregular shape, a structure having a high aspect ratio (for example, a wire, a fiber, a ribbon, a tube, or the like), a sheet, and the like.

Germanium Compound

The raw material germanium compound that is used as the shape-controlling agent is not particularly limited, and a well-known germanium compound can be used. As specific examples of the raw material germanium compound, germanium metal, germanium dioxide, germanium monoxide, germanium tetrachloride, an organic germanium compound having a Ge—C bond, and the like are exemplified. The raw material germanium compound may be used singly or two or more kinds may be used in combination. In addition, the shape-controlling agent may be jointly used with another shape-controlling agent as long as the effect in the present invention is not impaired.

The shape of the raw material germanium compound is not particularly limited, and it is possible to preferably use, for example, a spherical structure, an irregular shape, a structure having a high aspect ratio (for example, a wire, a fiber, a ribbon, a tube, or the like), a sheet, and the like.

(Potassium Compound)

Together with the shape-controlling agent, a potassium compound may be further jointly used.

The potassium compound is not particularly limited, and potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, potassium tungstate, and the like are exemplified. At this time, the potassium compounds include an isomer in the same manner as the molybdenum compound. Among these, potassium carbonate, potassium hydrogen carbonate, potassium oxide, potassium hydroxide, potassium chloride, potassium sulfate, and potassium molybdate are preferably used, and potassium carbonate, potassium hydrogen carbonate, potassium chloride, potassium sulfate, and potassium molybdate are more preferably used. The potassium compound may be used singly or two or more kinds may be used in combination. In addition, potassium molybdate includes molybdenum and is thus capable of having the above-described function as the molybdenum compound.

The potassium compound contributes to the efficient formation of an alumina surface layer by mullite.

The potassium compound contributes to the efficient formation of an alumina surface layer by a layer including germanium.

(Molybdenum Compound)

The molybdenum compound includes a molybdenum element and, as described below, functions as the flux agent in the α crystal growth of alumina.

The molybdenum compound is not particularly limited, and molybdenum oxide and a compound in which molybdenum metal contains an acid radical anion ($MoO_x^{n-}$) formed of a bond with oxygen are exemplified.

The compound containing the acid radical anion ($MoO_x^{n-}$) is not particularly limited, and molybdenum oxide, sodium molybdate, potassium molybdate, lithium molybdate, $H_3PMo_{12}O_{40}$, $H_3SiMo_{12}O_{40}$, $NH_4Mo_7O_{12}$, molybdenum disulfide, and the like are exemplified.

It is also possible to include silicon in the molybdenum compound, and, in this case, the molybdenum compound including silicon plays a role of both the flux agent and the shape-controlling agent.

Among the above-described molybdenum compounds, molybdenum oxide is preferably used from the viewpoint of the ease in sublimation and costs. In addition, the molybdenum compound may be used singly or two or more kinds may be used in combination.

The amounts of the aluminum compound, the molybdenum compound, silicon or the silicon compound, the germanium compound, the potassium compound, and the like used need to be appropriately determined, and, in the case of appropriately increasing the amount of the molybdenum compound used, it is possible to increase the value of the (006/113) ratio or the particle size of the plate-like alumina particle, and it is possible to improve the brilliance of an alumina particle to be obtained. Further, it is possible to improve the aspect ratio.

In addition, in the case of appropriately increasing the amount of silicon or the silicon compound used, it is possible to increase the value of the (006/113) ratio or the particle size of the plate-like alumina particle, and it is possible to improve the brilliance of an alumina particle to be obtained. Further, it is possible to accelerate the formation of mullite and, further, improve the aspect ratio.

From the above-described viewpoint, when the total amount of the raw materials in forms of oxides is assumed to be, for example, 100% by mass, it is possible to mix the following (i), (ii) and (iii) to produce a mixture and fire the mixture.

(i) Preferably 50% by mass or more of the aluminum compound, more preferably 70% by mass or more and 99% by mass or less of the aluminum compound, and still more preferably 80% by mass or more and 94.5% by mass or less of the aluminum compound in a form of $Al_2O_3$ (ii) Preferably 7% by mass or more and 40% by mass or less of the molybdenum compound, more preferably 9% by mass or more and 30% by mass or less of the molybdenum compound, and still more preferably 10% by mass or more and 17% by mass or less of the molybdenum compound in a form of $MoO_3$.

(iii) Preferably 0.4% by mass or more and less than 10% by mass of silicon, the silicon compound, and/or the germanium compound, more preferably 0.5% by mass or more and 10% by mass or less of silicon, the silicon compound, and/or the germanium compound, still more preferably 0.7% by mass or more and 7% by mass or less of silicon, the silicon compound, and/or the germanium compound, and particularly preferably 1% by mass or more and 3% by mass or less of silicon, the silicon compound, and/or the germanium compound in a form of $SiO_2$ and/or in a form of $GeO_2$.

Silicon, the silicon compound, and/or the germanium compound as the shape-controlling agent may be silicon or a silicon compound; or a germanium compound.

As the shape-controlling agent, only silicon or the silicon compound may be used, the germanium compound may be used, and silicon or the silicon compound and the germanium compound may be used in combination.

In the case of using the germanium compound as the shape-controlling agent, when the total amount of the raw materials in the forms of oxides is assumed to be, for example, 100% by mass, preferably 0.4% by mass or more and less than 1.5% by mass of the raw material germanium compound and more preferably 0.7% by mass or more and 1.2% by mass or less of the raw material germanium compound in a form of $GeO_2$ may be formulated into the mixture.

Regarding a condition of the raw material formulations (% by mass), the formulations of individual raw materials may be freely combined, and the lower limit values and the upper limit values in the respective raw material formulations (% by mass) can be freely combined.

When a variety of compounds are used in the above-described ranges, it is possible to easily manufacture a plate-like alumina particle which satisfies the value of the (006/113) ratio and has excellent brilliance.

In a case where the mixture further includes the potassium compound, the amount of the potassium compound used is not particularly limited; however, preferably, when the total amount of the raw materials in forms of oxides is assumed to be 100% by mass, it is possible to mix 5% by mass or less of the potassium compound in a form of $K_2O$. More preferably, when the total amount of the raw materials in forms of oxides is assumed to be 100% by mass, it is possible to mix 0.01% by mass or more and 3% by mass or less of the potassium compound in the form of $K_2O$. Still more preferably, when the total amount of the raw materials in forms of oxides is assumed to be 100% by mass, it is possible to mix 0.05% by mass or more and 1% by mass or less of the potassium compound in the form of $K_2O$.

It is considered that, due to the use of the potassium compound, potassium molybdate formed by a reaction with the molybdenum compound creates an effect for diffusing raw material germanium and contributes to the acceleration of the formation of germanium or the germanium compound on the surface of the plate-like alumina particle.

As the potassium compound used during the preparation of the raw material or generated by a reaction in a heating process in firing, a water-soluble potassium compound, for example, potassium molybdate is not gasified even in a firing temperature region and can be easily collected during washing after firing, and thus the amount of the molybdenum compound being discharged to the outside of a firing furnace is also reduced, and the production cost can also be significantly reduced.

The numerical ranges of the amounts of the respective raw materials used can be appropriately combined within a range in which the total content thereof does not exceeds 100% by mass.

[Firing Step]

The firing step is a step of firing the aluminum compound in the presence of the molybdenum compound and the shape-controlling agent. The firing step may be a step of firing the mixture obtained in the mixing step.

The plate-like alumina particle according to the embodiment is obtained by, for example, firing the aluminum compound in the presence of the molybdenum compound and the shape-controlling agent. As described above, this manufacturing method is called the flux method.

The flux method is classified into a solution method. In more detail, the flux method is a crystal growth method in which the fact that a crystal-flux binary phase diagram is a eutectic-type phase diagram is used. The mechanism of the flux method is conjectured to be as described below. That is, when a mixture of a solute and a flux is heated, the solute and the flux become a liquid phase. At this time, the flux is a fusing agent, in other words, the solute-flux binary phase diagram is a eutectic-type phase diagram, and thus the solute is fused at a temperature lower than the melting temperature of the solute and configures the liquid phase. When the flux is vaporized in this state, the concentration of the flux decreases, in other words, the effect of the flux for lowering the melting temperature of the solute becomes weak, and the vaporization of the flux serves as a driving force, whereby the crystal growth of the solute is caused (flux vaporization method). The solute and the flux are also capable of causing the crystal growth of the solute by cooling the liquid phase (slow cooling method).

The flux method has advantages of causing crystal growth at a temperature far lower than the melting temperature, precisely controlling the crystal structure, and forming a polyhedral crystal having an euhedral face.

Regarding the manufacturing of an α-alumina particle by the flux method in which the molybdenum compound is used as the flux, the mechanism is not clear, but is conjectured, for example, as described below. That is, when the aluminum compound is fired in the presence of the molybdenum compound, aluminum molybdate is first formed. At this time, as is clear from the above description, the aluminum molybdate grows an α-alumina crystal at a temperature lower than the melting temperature of alumina. In addition, the crystal growth is accelerated through, for example, the decomposition of the aluminum molybdate, the vaporization of the flux, and the like, whereby an alumina particle can be obtained. That is, the molybdenum compound functions as the flux, and the α-alumina particle is produced via an intermediate of aluminum molybdate.

Regarding the manufacturing of the α-alumina particle by the flux method in which the potassium compound is further used as the flux, the mechanism is not clear, but it is conjectured, for example, as described below. First, the molybdenum compound and the aluminum compound react with each other, thereby forming aluminum molybdate. In addition, for example, the aluminum molybdate is decomposed to become molybdenum oxide and alumina, and, at the same time, the molybdenum compound including molybdenum oxide obtained by decomposition reacts with the potassium compound, thereby forming potassium molybdate. An alumina crystal grows in the presence of the molybdenum compound including the potassium molybdate, whereby the plate-like alumina particle according to the embodiment can be obtained.

A plate-like alumina particle which satisfies the value of the (006/113) ratio and has excellent brilliance can be manufactured by the flux method.

A method for the firing is not particularly limited, and the firing can be performed by a well-known conventional method. When the firing temperature exceeds 700° C., the aluminum compound and the molybdenum compound react with each other, thereby forming aluminum molybdate. Further, when the firing temperature reaches 900° C. or higher, the aluminum molybdate is decomposed, and the plate-like alumina particle is formed by the action of the shape-controlling agent. In addition, it is considered that, in the plate-like alumina particle, when the aluminum molybdate is decomposed to become alumina and molybdenum oxide, the molybdenum compound is incorporated into an aluminum oxide particle.

In addition, it is considered that, when the firing temperature reaches 900° C. or higher, the molybdenum compound obtained by the decomposition of the aluminum molybdate (for example, molybdenum trioxide) reacts with the potassium compound, thereby forming potassium molybdate.

Further, it is considered that, when the firing temperature reaches 1000° C. or higher, $Al_2O_3$ and $SiO_2$ on the surface of the plate-like alumina particle react with each other together with the crystal growth of the plate-like alumina particle in the presence of molybdenum, thereby forming mullite at a high efficiency.

Similarly, it is considered that, when the firing temperature reaches 1000° C. or higher, $Al_2O_3$ and the Ge compound on the surface of the plate-like alumina particle react with each other together with the crystal growth of the plate-like alumina particle in the presence of molybdenum, thereby forming a compound having germanium dioxide or Ge—O—Al or the like at a high efficiency.

In addition, during the firing, the states of the aluminum compound, the shape-controlling agent, and the molybdenum compound are not particularly limited, and the molybdenum compound and the shape-controlling agent need to be present in the same space so that the molybdenum compound and the shape-controlling agent are capable of acting on the aluminum compound. Specifically, the molybdenum compound, the shape-controlling agent, and the aluminum compound may be mixed together by simple mixing of mixing the powders of the molybdenum compound, the shape-controlling agent, and the aluminum compound, mechanical mixing by a grinder, a mixer or the like, or mixing by a mortar or the like, and the molybdenum compound, the shape-controlling agent, and the aluminum compound may be mixed together in a dry state or a wet state.

The condition of the firing temperature is not particularly limited and is appropriately determined by the value of the (006/113) ratio, the average particle diameter, and the aspect ratio of a target plate-like alumina particle, the formation of mullite, the value of the longitudinal relaxation time $T_1$, dispersibility, and the like. Generally, regarding the temperature of firing, the peak temperature is preferably equal to or higher than 900° C. that is the decomposition temperature of aluminum molybdate ($Al_2(MoO_4)_3$), more preferably equal to or higher than 1000° C. at which mullite or the germanium compound is highly efficiently formed, and more preferably equal to or higher than 1,200° C. at which a plate-like alumina particle having a longitudinal relaxation time $T_1$ of five seconds or longer (highly crystalline) can be easily obtained.

Generally, when it is intended to control the shape of α-alumina obtained after firing, it is necessary to perform firing at a high temperature of 2000° C. or higher that is close to the melting temperature of α-alumina, which creates a significant problem in industrial use from the viewpoint of the load on a firing furnace or fuel costs.

The manufacturing method of the embodiment can also be performed even at a high temperature of higher than 2000° C.; however, even at a temperature far lower than the melting temperature of α-alumina which is 1600° C. or lower, it is possible to form α-alumina having a plate-like shape having a high α crystallization rate and a high aspect ratio regardless of the shape of a precursor.

According to an embodiment of the present invention, even in a condition of the peak firing temperature being 900° C. to 1600° C., it is possible to efficiently form a plate-like alumina particle having a high aspect ratio and an α crystallization rate of 90% or more at a low cost, firing at a peak temperature of 950° C. to 1500° C. is more preferable, firing at a peak temperature of 1000° C. to 1400° C. is still more preferable, and firing at a peak temperature of 1200° C. to 1400° C. is most preferable.

Regarding the time of firing, it is preferable to increase the temperature to a predetermined peak temperature in a range of 15 minutes to 10 hours and hold the firing peak temperature in a range of five minutes to 30 hours. In order to efficiently form the plate-like alumina particle, the firing holding time is more preferably approximately 10 minutes to 15 hours.

When conditions of a peak temperature of 1000° C. to 1400° C. and a firing holding time of 10 minutes to 15 hours are selected, a dense α crystal-form polygonal plate-like alumina particle does not easily aggregate and is easily obtained.

When conditions of a peak temperature of 1200° C. to 1400° C. and a firing holding time of 10 minutes to 15 hours are selected, a plate-like alumina particle having a longitudinal relaxation time $T_1$ of five seconds or longer (highly crystalline) is easily obtained.

The atmosphere of firing is not particularly limited as long as the effect of the present invention can be obtained. For example, an oxygen-containing atmosphere such as air or oxygen or an inert atmosphere such as nitrogen, argon, or carbon dioxide are preferable, and an air atmosphere is more preferable in the case of considering the cost.

An apparatus for firing is not always limited, and a so-called firing furnace can be used. The firing furnace is preferably configured of a material that does not react with sublimated molybdenum oxide, and a highly airtight firing furnace is preferably used so as to more efficiently use molybdenum oxide.

[Molybdenum Removal Step]

The method for manufacturing the plate-like alumina particle may further include a molybdenum removal step of removing at least part of molybdenum as necessary after the firing step.

As described above, molybdenum is sublimated during firing, it is possible to control the content of molybdenum present in the surface layer of the plate-like alumina particle by controlling the firing time, the firing temperature, or the like, and it is possible to control the content of molybdenum present in a region except for the surface layer of the alumina particle (inner layer) or the presence state thereof.

Molybdenum can be attached to the surface of the plate-like alumina particle. As means except for the sublimation, the molybdenum can be removed by being washed with water, an ammonia aqueous solution, a sodium hydroxide aqueous solution, or an acidic aqueous solution. Molybdenum may not be removed from the plate-like alumina particle, but at least molybdenum on the surface is preferably removed since the alumina is capable of exhibiting the intrinsic properties when used in a state of being dispersed in a medium to be dispersed based on a variety of binders and molybdenum present on the surface does not create any disadvantages.

At this time, the content of molybdenum can be controlled by appropriately changing the concentration and amount of water, the ammonia aqueous solution, the sodium hydroxide aqueous solution, or the acidic aqueous solution used, the washing area, the washing time, and the like.

[Grinding Step]

In a fired substance, there is a case where the plate-like alumina particle aggregates and does not satisfy a particle diameter range preferable for the present invention. Therefore, the plate-like alumina particle may be ground as necessary so as to satisfy the particle diameter range preferable for the present invention.

A method for grinding the fired substance is not particularly limited, and a well-known method in the related art such as a ball mill, a jaw crusher, a jet mill, a disk mill, a spectromill, a grinder, or a mixer mill can be applied.

[Classification Step]

The plate-like alumina particle is preferably subject to a classification treatment in order to adjust the average particle diameter and improve the fluidity of powder or to suppress an increase in viscosity when formulated into a binder for forming a matrix. The "classification treatment" refers to an operation to divide particles into groups based on the size of the particle.

The classification may be any of a wet type and a dry type, and dry-type classification is preferable from the viewpoint of productivity. Examples of the dry-type classification include not only classification by a sieve but also wind power classification in which classification is performed by a difference between the centrifugal force and the fluid drag, and from the viewpoint of classification precision, wind power classification is preferable, and it is possible to perform wind power classification using a classifier such as an air classifier in which the Coanda effect is used, a swirling airflow-type classifier, a forced vortex centrifugal classifier, or a semi-free vortex centrifugal classifier.

The grinding step or the classification step can be performed at any stage as necessary including before or after an organic compound layer-forming step. For example, the average particle diameter of a plate-like alumina particles to be obtained can be adjusted by presence or absence of grinding or classification and the condition selection therefor.

The plate-like alumina particle of the present embodiment or a plate-like alumina particle obtained by the manufacturing method of the present embodiment is preferably aggregated to a small or no extent since the intrinsic properties are easily exhibited, the handleability and dispersibility are further improved when used in a state of being dispersed in a medium to be dispersed. In the method for manufacturing the plate-like alumina particle, it is preferable that a plate-like alumina particle that is aggregated to a small or no extent be obtained without performing the grinding step and the classification step since there is no need to perform the above-described steps and plate-like alumina having target excellent properties can be manufactured with high productivity.

[Organic Compound Layer-Forming Step]

In an embodiment, the method for manufacturing the plate-like alumina particle may further include an organic compound layer-forming step. Generally, the organic compound layer-forming step is performed after the firing step or after the molybdenum removal step.

A method for forming an organic compound layer is not particularly limited, and a well-known method can be appropriately employed. For example, a method in which a liquid containing an organic compound is brought into contact with a plate-like alumina particle including molybdenum and dried is exemplified.

As the organic compound that can be used for the formation of the organic compound layer, the above-described organic compound can be used.

<Resin Composition>

As an embodiment of the present invention, a resin composition containing a resin and the plate-like alumina particle of the embodiment is provided. The resin is not particularly limited, and a thermosetting resin, a thermoplastic resin, and the like can be exemplified.

The resin composition can be cured to produce a cured substance of the resin composition or can be cured and molded to produce a molded substance of the resin composition. For molding, it is possible to appropriately perform a treatment such as melting or kneading on the resin composition. As a molding method, compression molding, injection molding, extrusion molding, foam molding, and the like are exemplified. Among these, extrusion molding by an extrusion molder is preferable, and extrusion molding by a biaxial extruder is more preferable.

In a case where the resin composition is used as a coating agent, a paint, or the like, it is possible to form a coated film having a cured substance of the resin composition by applying the resin composition to a coating subject.

<Method for Manufacturing Resin Composition>

According to an embodiment of the present invention, a method for manufacturing the resin composition is provided.

The manufacturing method includes a step of mixing the plate-like alumina particle of the embodiment and a resin.

As the plate-like alumina particle, the above-described plate-like alumina particle can be used and thus will not be described.

As the plate-like alumina particle, a surface-treated plate-like alumina particle can be used.

In addition, only one kind of plate-like alumina particle may be used or two or more kinds of plate-like alumina particles may be used in combination.

Further, the plate-like alumina particle may be used in combination with a filler (alumina, spinel, boron nitride, aluminum nitride, magnesium oxide, magnesium carbonate, or the like).

The content of the plate-like alumina particle is preferably 5% to 95% by mass, more preferably 10% to 90% by mass, and still more preferably 30% to 80% by mass relative to 100% by mass of the resin composition. The content of the plate-like alumina particle is preferably 5% by mass or more since the high thermal conduction property of the plate-like alumina particle can be efficiently exhibited. On the other hand, the content of the plate-like alumina particle is preferably 95% by mass or less since a resin composition having excellent moldability can be obtained.

In a case where the resin composition is used as a coating agent, paint, or the like, from the viewpoint of exhibiting excellent brilliance and facilitating the formation of a coated film, the content of the plate-like alumina particle is preferably 0.1% to 95% by mass, more preferably 1% to 50% by mass, and still more preferably 3% to 30% by mass relative to 100% by mass of the mass of the solid content of the resin composition.

[Resin]

The resin is not particularly limited, and a thermoplastic resin and a thermosetting resin are exemplified.

The thermoplastic resin is not particularly limited, and a well-known conventional resin that is used as a molding material or the like can be used. Specifically, a polyethylene resin, a polypropylene resin, a polymethyl methacrylate resin, a polyvinyl acetate resin, an ethylene-propylene copolymer, an ethylene-vinyl acetate copolymer, a polyvinyl chloride resin, a polystyrene resin, a polyacrylonitrile resin, a polyamide resin, a polycarbonate resin, a polyacetal resin, a polyethylene terephthalate resin, a polyphenylene oxide resin, a polyphenylene sulfide resin, a polysulfone resin, a polyethersulfone resin, a polyetheretherketone resin, a polyallylsulfone resin, a thermoplastic polyimide resin, a thermoplastic urethane resin, a polyaminobismaleimide resin, a polyamide-imide resin, a polyetherimide resin, a bismaleimide triazine resin, a polymethylpentene resin, a fluorinated resin, a liquid crystal polymer, a polyolefin-vinyl alcohol copolymer, an ionomer resin, a polyarylate resin, an acrylonitrile-ethylene-styrene copolymer, an acrylonitrile-butadiene-styrene copolymer, an acrylonitrile-styrene copolymer, and the like are exemplified.

The thermosetting resin is a resin having a characteristic that the resin can be changed to be substantially insoluble or infusible when cured by means such as heating, radioactive rays, or a catalyst, and, generally, a well-known conventional resin that is used as a molding material or the like can be used. Specifically, novolac-type phenol resins such as a phenol novolac resin and a cresol novolac resin; phenol resins such as an unmodified resole phenol resin and an oil-modified resole phenol resin modified with wood oil, linseed oil, walnut oil, or the like; bisphenol-type epoxy resins such as a bisphenol A epoxy resin and a bisphenol F epoxy resins; novolac-type epoxy resins such as an aliphatic chain-modified bisphenol-type epoxy resin, a novolac epoxy resin, and a cresol novolac epoxy resin; epoxy resins such as a biphenyl-type epoxy resin and a polyalkylene glycol-type epoxy resin; resins having a triazine ring such as a urea (urea) resin and a melamine resin; vinyl resins such as a (meth)acrylic resin and a vinyl ester resin; unsaturated polyester resins, bismaleimide resins, polyurethane resins, diallyl phthalate resins, silicone resins, resins having a benzoxazine ring, cyanate ester resins, and the like are exemplified.

The resin may be used singly or two or more kinds may be used in combination. At this time, two or more kinds of thermoplastic resins may be used, two or more kinds of thermosetting resins may be used, or one or more kinds of thermoplastic resins and one or more kinds of thermosetting resins may be used.

The content of the resin is preferably 5% to 90% by mass and more preferably 10% to 70% by mass relative to 100% by mass of the resin composition. The content of the resin is preferably 5% by mass or more since it is possible to impart excellent moldability to the resin composition. On the other hand, the content of the resin is preferably 90% by mass or less since the resin composition is capable of obtaining a high thermal conduction property as a compound by being molded.

[Curing Agent]

Into the resin composition, a curing agent may be mixed as necessary.

The curing agent is not particularly limited, and a well-known curing agent can be used.

Specifically, an amine-based compound, an amide-based compound, an acid anhydride-based compound, a phenol-based compound, and the like are exemplified.

As the amine-based compound, diaminodiphenylmethane, diethylenetriamine, triethylenetetramine, diaminodiphenylsulfone, isophoronediamine, imidazole, a $BF_3$-amine complex, a guanidine derivative, and the like are exemplified.

As the amide-based compound, dicyandiamide, a polyamide resin synthesized from a dimer of linolenic acid and ethylenediamine, and the like are exemplified.

As the acid anhydride-based compound, phthalic anhydride, trimellitic anhydride, pyromellitic anhydride, maleic anhydride, tetrahydrophthalic anhydride, methyltetrahydrophthalic anhydride, methylmalic anhydride, hexahydrophthalic anhydride, methylhexahydrophthalic anhydride, and the like are exemplified.

As the phenol-based compound, polyhydric phenol compounds such as a phenol novolac resin, a cresol novolac resin, an aromatic hydrocarbon formaldehyde resin-modified phenol resin, a dicyclopentadiene phenol addition-type resin, a phenol aralkyl resin (zylok resin), a polyhydric phenol novolac resin synthesized from a polyhydric hydroxy compound represented by a resorcin novolac resin and formaldehyde, a naphthol aralkyl resin, a trimethylol methane resin, a tetraphenyl ethane resin, a naphthol novolac resin, a naphthol-phenol co-condensed novolac resin, a naphthol-cresol co-condensed novolac resin, a biphenyl-modified phenol resin (polyhydric phenol compound to which a phenol nucleus is linked with a bismethylene group), an aminotriazine-modified phenolic resin (polyhydric phenol compound to which a phenol nucleus is linked with melamine, benzoguanamine, or the like), and an alkoxy group-containing aromatic ring-modified novolac resin (polyhydric phenol compound to which a phenol nucleus and an alkoxy group-containing aromatic ring are linked with formaldehyde) are exemplified.

The curing agent may be used singly or two or more kinds may be used in combination.

[Curing Accelerator]

Into the resin composition, a curing accelerator may be mixed as necessary.

The curing accelerator has a function of accelerating curing at the time of curing the composition.

The curing accelerator is not particularly limited, and a phosphorus compound, a tertiary amine, an imidazole, an organic acid metal salt, a Lewis acid, an amine complex salt, and the like are exemplified.

The curing accelerator may be used singly or two or more may be used in combination.

[Curing Catalyst]

Into the resin composition, a curing catalyst may be mixed as necessary.

The curing catalyst has, instead of the curing agent, a function of progressing a curing reaction of a compound having an epoxy group.

The curing catalyst is not particularly limited, and a well-known conventional thermopolymerization initiator or active energy-ray polymerization initiator can be used.

The curing catalyst may be used singly or two or more kinds may be used in combination.

[Viscosity Adjuster]

Into the resin composition, a viscosity adjuster may be mixed as necessary.

The viscosity adjuster has a function of adjusting the viscosity of the composition.

The viscosity adjuster is not particularly limited, and an organic polymer, a polymer particle, an inorganic particle, and the like can be used.

The viscosity adjuster may be used singly or two or more kinds may be used in combination.

[Plasticizer]

Into the resin composition, a plasticizer may be mixed as necessary.

The plasticizer has a function of improving the workability, flexibility, weather resistance, and the like of a thermoplastic synthetic resin.

The plasticizer is not particularly limited, and a phthalic acid ester, an adipic acid ester, a phosphoric acid ester, a trimellitic acid ester, polyester, polyolefin, polysiloxane, and the like can be used.

The plasticizer may be used singly or two or more kinds may be used in combination.

[Mixing]

The resin composition according to the present form can be obtained by mixing the plate-like alumina particle, the resin, and, further, other formulated substances as necessary. A mixing method is not particularly limited, and the components are mixed by a well-known conventional method.

In a case where the resin is a thermosetting resin, as a method for mixing an ordinary thermosetting resin and the plate-like alumina particle or the like, a method in which a predetermined amount of the thermosetting resin to be formulated, the plate-like alumina particle, and other components as necessary are sufficiently mixed together by a mixer or the like and then kneaded by a triple roll or the like, thereby obtaining a fluid liquid-form composition is exemplified. In addition, as a method for mixing a thermosetting resin and the plate-like alumina particle or the like in another embodiment, a method in which a predetermined amount of the thermosetting resin to be formulated, the plate-like alumina particle, and other components as necessary are sufficiently mixed together by a mixer or the like, then, melted and kneaded by a mixing roll, an extruder, and the like, and then cooled, thereby obtaining a solid-form composition is exemplified.

Regarding the mixing state, in the case of formulating the curing agent, the catalyst, or the like, a curable resin and a formulated substance thereof need to be sufficiently and uniformly mixed together, and the plate-like alumina particle is also more preferably uniformly dispersed and mixed.

As a method for mixing an ordinary thermosetting resin and the plate-like alumina particle or the like in a case where the resin is a thermoplastic resin, a method in which the thermoplastic resin, the plate-like alumina particle, and other components as necessary are previously mixed together by, for example, a variety of mixers such as a tumbler or a Henschel mixer and then melted and kneaded by a mixer such as a BANBURY mixer, a roll, brabender, a single-screw kneading extruder, a twin-screw kneading extruder, a kneader, or a mixing roll is exemplified. The temperature during melting and kneading is not particularly limited, but is generally in a range of 100° C. to 320° C.

A coupling agent may be externally added to the resin composition since the coupling agent further enhances the fluidity of the resin composition or the filler-filling property of the plate-like alumina particle or the like. When the coupling agent is externally added, the adhesiveness between the resin and the plate-like alumina particle is further enhanced, the interface heat resistance between the resin and the plate-like alumina particle decreases, and the thermal conduction property of the resin composition is capable of improving.

As the organosilane compound, for example, alkyltrimethoxysilanes or alkyltrichlorosilanes in which the number of carbon atoms in an alkyl group is 1 to 22 such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, hexyltrimethoxysilane, and octenyltrimethoxysilane, 3,3,3-trifluoropropyltrimethoxysilane, tridecafluoro-1,1,2,2-tetrahydrooctyl)trichlorosilanes, phenyltrimethoxysilane, phenyltriethoxysilane, p-chloromethylphenyltrimethoxysilane, p-chloromethylphenyltriethoxysilanes and the like, γ-glycidoxypropyltrimethoxysilane, γ-glycidoxypropyltriethoxysilane, epoxy silanes such as β-(3,4-epoxycyclohexyl)ethyltrimethoxysilane and glycidoxyoctyltrimethoxysilane, aminosilanes such as γ-aminopropyltriethoxysilane, N-β(aminoethyl) γ-aminopropyltrimethoxysilane, N-β(aminoethyl)γ-aminopropylmethyldimethoxysilane, γ-aminopropyltrimethoxysilane, and γ-ureidopropyltriethoxysilane, mercaptosilanes such as 3-mercaptopropyltrimethoxysilane, vinyl silanes such as p-styryltrimethoxysilane, vinyltrichlorosilane, vinyltris(β-methoxyethoxy)silane, vinyltrimethoxysilane, vinyltriethoxysilane, γ-methacryloxypropyl trimethoxysilane, methacryloxyoctyl trimethoxysilane, and, further, an epoxy-based polymer-type silane, an amino-based polymer-type silane, and a vinyl-based polymer-type silane may be used. The organosilane compound may be included singly or two or more kinds may be included.

The coupling agent may be used singly or two or more kinds may be used in combination.

The amount of the coupling agent added is not particularly limited, but is preferably 0.01% to 5% by mass and more preferably 0.1% to 3% by mass of the mass of the resin.

According to an embodiment, the resin composition is used for a thermal conductive material.

The plate-like alumina particle contained in the resin composition is excellent for the thermal conduction property of the resin composition, and thus the resin composition is preferably used as an insulating heat-dissipating member. In such a case, it is possible to improve the heat dissipation function of an apparatus and to contribute to the size and weight reduction of an apparatus and performance improvement.

The plate-like alumina particle contained in the resin composition has excellent brilliance, and thus the resin composition is preferably used as a coating agent, paint, or the like.

<Method for Manufacturing Cured Substance>

According to an embodiment of the present invention, a method for manufacturing a cured substance is provided. The manufacturing method includes the curing of the resin composition manufactured above.

The curing temperature is not particularly limited, but is preferably 20° C. to 300° C. and more preferably 50° C. to 200° C.

The curing time is not particularly limited, but is preferably 0.1 to 10 hours and more preferably 0.2 to 3 hours.

The shape of the cured substance changes depending on a desired application and can be appropriately set by a skilled person in the related art.

EXAMPLES

Next, the present invention will be described in more detail by describing examples, but the present invention is not limited to the following examples.

<<Manufacturing of Plate-Like Alumina Particle>>

Example 1

100 g of aluminum hydroxide (average particle diameter: 1 to 2 μm), 0.65 g of silicon dioxide (produced by KANTO CHEMICAL CO., INC., special grade), and 6.5 g of molybdenum trioxide (produced by TAIYO KOKO CO., LTD.) were mixed together in a mortar, thereby obtaining a mixture. The obtained mixture was put into a crucible, heated up to 1200° C. in a ceramic electric furnace under a condition of 5° C./minute, and held at 1200° C. for 10 hours, thereby firing the mixture. After that, the mixture was cooled to room temperature under a condition of 5° C./minute and then removed from the crucible, thereby obtaining 67.0 g of light blue powder. The obtained powder was pulverized until the powder became capable of passing through a 2 mm sieve.

Subsequently, 65.0 g of the obtained light blue powder was dispersed in 250 mL of 0.25% by mass ammonia water, a dispersion solution was stirred at room temperature (25° C. to 30° C.) for three hours and then passed through a 106 μm sieve, the ammonia water was removed by filtration, and water washing and drying were performed to remove molybdenum remaining on the surface of the particle, thereby obtaining 60.0 g of light blue powder.

It was confirmed by SEM observation that the obtained powder was a powder having a plate-like shape in which the shape was a polygonal plate shape, the number of aggregates was extremely small, and handleability was excellent. Further, as a result of XRD measurement, it was confirmed that sharp peak scattering derived from α-alumina appeared, no alumina crystal-based peaks except for an α crystal structure were observed, and the plate-like alumina had a dense crystal structure. Further, from the result of a fluorescent X-ray quantitative analysis, it was confirmed that the content of molybdenum in the form of molybdenum trioxide was 0.3% by mass relative to 100% by mass of the obtained particle.

Examples 2 to 7, Comparative Example 1

Plate-like alumina particles of Examples 2 to 7 were manufactured in the same manner as in Example 1 except for the fact that, in the mixture, the formulations of the raw materials of silicon dioxide, molybdenum trioxide, and germanium dioxide (produced by MITSUBISHI MATERIALS ELECTRONIC CHEMICALS CO., LTD.) were changed as shown in Table 1.

Plate-like alumina particles of Comparative Example 1 were manufactured in the same manner as in Example 1 except for the fact that, the formulations of the were changed as shown in Table 1, and the firing condition were changed to 1100° C. for 3 hours.

Comparative Example 2

Evaluation was performed by using commercially available alumina (SERATH produced by KINSEI MATEC CO., LTD.).

TABLE 1

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Actual formulation (g) | Al(OH)$_3$ | 100 | 100 | 100 | 100 | 100 | 100 | 100 | 77 | — |
| | MoO$_3$ | 6.5 | 8.45 | 9.75 | 5 | 6.5 | 13 | 13 | 50 | — |
| | SiO$_2$ | 0.65 | 0.65 | 0.975 | 0.65 | 0 | 0 | 0.325 | 0.1 | — |
| | GeO$_2$ | 0 | 0 | 0 | 0 | 0.65 | 0.65 | 0.325 | 0 | — |

<<Evaluation>>

The powders of Examples 1 to 7 and Comparative Example 1 and 2 were used as samples, and the following evaluations were performed. Measurement methods are described below.

[Measurement of Major Axis L of Plate-Like Alumina]

1 mg of alumina powder was added in a 0.2% by mass of sodium hexametaphosphate (produced by FUJIFILM WAKO PURE CHEMICAL CORPORATION) aqueous solution to obtain a sample having a total amount of 18 g.

The sample was measured by using a laser diffraction particle diameter measurement apparatus SALD-7000 (produced by SHIMADZU CORPORATION), and the average particle diameter $D_{50}$ was obtained and regarded as the major axis L. In addition, the particle diameter $D_{10}$ (μm) and the particle diameter $D_{90}$ (μm) were also obtained.

[Measurement of Thickness D of Plate-Like Alumina]

The average value of 50 thicknesses measured by using a scanning electron microscope (SEM) was employed and regarded as the thickness D (μm).

[Aspect Ratio L/D]

The aspect ratio was obtained by using the following expression.

Aspect ratio=major axis $L$ of plate-like alumina/ thickness $D$ of plate-like alumina

[Analysis of XRD Peak Intensity Ratio and Presence or Absence of Mullite]

The produced sample was placed on a measurement sample holder having a depth of 0.5 mm so as to be flattened with a predetermined load, the resulting holder was set into a wide-angle X-ray diffraction (XRD) apparatus (produced by Rigaku Corporation, Ultima IV), and measurement was performed under the conditions of Cu/Kα rays, 40 kV/40 mA, scan speed of 2 degrees/min, and a scanning range of 10 to 70 degrees.

The peak height of mullite that was recognized at 2θ=26.2±0.2 degrees was represented by A, the peak height of α-alumina on a (104) face that was recognized at 2θ=35.1±0.2 degrees was represented by B, and the value of a base line at 2θ=30±0.2 degrees was represented by C, and presence or absence of mullite was determined from a ratio of peak height of mullite to peak height of (104) face of α-alumina as shown in the following expression.

When the value of the ratio shown in the following expression was 0.02 or more, mullite was determined to be "present", and, when the value was less than 0.02, mullite was determined to be "absent".

Ratio of peak height of mullite to peak height of (104) face of α-alumina=(A−C)/(B−C)

[Evaluation of XRD Peak Intensity Ratio and Crystal Habit]

The produced sample was placed on a measurement sample holder having a depth of 0.5 mm so as to be flattened with a predetermined load, the resulting holder was set into a wide-angle X-ray diffraction (XRD) apparatus (produced by Rigaku Corporation, Ultima IV), and measurement was performed under the conditions of Cu/Kα rays, 40 kV/40 mA, scan speed of 2 degrees/min, and a scanning range of 10 to 70 degrees.

The ratio (006/113) of the peak intensity of a (006) face that was recognized at 2θ=41.6±0.3 degrees to the peak intensity of a (113) face that was recognized at 2θ=43.3±0.3 degrees was obtained.

As the value of the (006/113) ratio decreases, the shape becomes closer to a hexagonal bipyramid-type polyhedral shape in which the (113) face develops, and, as the value of the (006/113) ratio increases, the development of the (113) face is suppressed, and the shape becomes a plate-like shape in which the (006) face develops.

[Analysis of Amount of Si and Amount of Ge in Surface Layer of Plate-Like Alumina Particle]

The prepared sample was press-fixed on double-sided adhesive tape, and a composition analysis was performed under the following conditions by using an X-ray photoelectron spectroscopy (XPS) apparatus Quantera SXM (UL-VAC-PHI, Inc.).

X-ray source: Monochromatic AlKα, beam diameter of 100 μm and output of 25 W

Measurement: Area measurement (1,000 μm square) and n=3

Charge correction: C1s=284.8 eV

[Si]/[Al] obtained from the result of an XPS analysis was regarded as the amount of Si in the surface layer of the plate-like alumina particle.

[Ge]/[Al] obtained from the result of an XPS analysis was regarded as the amount of Ge in the surface layer of the plate-like alumina particle.

[Analysis of Amount of Si and Amount of Ge Included in Plate-Like Alumina Particle]

Approximately 70 mg of the prepared sample was placed on filter paper and covered with a PP film, and a composition analysis was performed by using an X-ray fluorescence (XRF) analysis apparatus Primus IV (produced by Rigaku Corporation).

[Si]/[Al] obtained from the result of an XRF analysis was regarded as the amount of Si in the plate-like alumina particle.

[Ge]/[Al] obtained from the result of an XRF analysis was regarded as the amount of Ge in the plate-like alumina particle.

[Analysis of Amount of Si, Amount of Ge, and Amount of Mo Included in Plate-Like Alumina Particle]

Approximately 70 mg of the prepared sample was placed on filter paper and covered with a PP film, and a composition analysis was performed by using an X-ray fluorescence analysis apparatus Primus IV (produced by Rigaku Corporation).

The amount of silicon, the amount of molybdenum, and the amount of germanium that are obtained from the XRF analysis result were obtained from the amount (% by mass) in a form of silicon dioxide, the amount (% by mass) in a form of germanium dioxide, and the amount (% by mass) in a form of molybdenum trioxide relative to 100% by mass of the plate-like alumina particle.

[Analysis of α-Crystallization Rate]

The prepared sample was placed on a measurement sample holder having a depth of 0.5 mm so as to be flattened with a predetermined load, the resulting holder was set into a wide-angle X-ray diffraction apparatus (Rint-Ultma IV produced by Rigaku Corporation), and measurement was performed under the conditions of Cu/Kα rays, 40 kV/40 mA, scan speed of 2 degrees/min, and a scanning range of 10 to 70 degrees. The α-crystallization rate was determined from the ratio of the most intense peak height of α-alumina to transition alumina.

[Measurement of Coordination Number by NMR]

A solid state $^{27}$Al NMR analysis was performed at a strength of static magnetic field of 14.1 T by using JNM-ECA600 produced by JEOL RESONANCE. Each sample was collected in a φ4 mm solid NMR sample tube, and measurement was performed. For each sample, the 90-degree pulse width was measured, and then the relaxation time and the single pulse were measured by a saturation recovery method.

A peak detected at 10 to 30 ppm in a case where the peak top of six-fold coordinated aluminum of γ-alumina (produced by KANTO CHEMICAL CO., INC.) of a commercially available reagent was set to 14.6 ppm was conjectured to be the peak of six-fold coordinated aluminum, and a peak detected at 60 to 90 ppm was conjectured to be the peak of fourfold coordinated aluminum.

Conditions are as described below.

MAS rate: 15 kHz
Probe: SH60T4 (produced by JEOL RESONANCE)
Measurement conditions for the measurement of the single pulse at 14.1 T are as described below.
Pulse delay time (seconds): ($T_1$ (seconds) obtained by a relaxation recovery method×3)
Pulse width (microseconds): 90-degree pulse width (microseconds) of six-fold coordinated aluminum of each sample/3
Cumulated number: Eight times

[Measurement of Longitudinal Relaxation Time $T_1$ by NMR]

The longitudinal relaxation time $T_1$ with respect to the peak of six-fold coordinated aluminum detected at 10 to 30 ppm was obtained by the relaxation recovery method at 14.1 T.

[Evaluation of Brilliance]

The powder was visually observed and evaluated on the basis of the following standards.
- A . . . Intense reflection of glittering light that is derived from the powder can be observed
- B . . . Slightly intense reflection of glittering light that is derived from the powder can be observed
- C . . . Reflection of glittering light that is derived from the powder can be observed
- D . . . Reflection of glittering light that is derived from the powder cannot be observed The formulations (the total was set to 100% by mass) of the raw material compounds in forms of oxides and the evaluation results are shown in Table 2.

brilliance than the alumina particle of Comparative Example 1 and 2. It was found that, as the value of the (006/113) ratio increases, brilliance further improves. The plate-like alumina particles of Examples 3, 6, and 7 had a particularly large value of the (006/113) ratio and had extremely high brilliance. From the comparison of Example 2 with Example 3, it could be confirmed that a larger value of the (006/113) ratio further improves the brilliance when the particle diameter is the same.

In addition, as a result of measuring the α-crystallization rate, it was confirmed that no alumina crystal-based peaks except for the α crystal structure were observed, and the powders obtained in Examples 1 to 7 and Comparative Example 1 and 2 had an α-crystallization rate of 90% or more.

In addition, the plate-like alumina particles of Examples 1 to 7 in which the longitudinal relaxation time $T_1$ was five seconds or longer were probably more highly crystalline and were thus further improved in brilliance than the alumina particle of Comparative Example 1 and 2.

The presence of Si, Ge, and Mo derived from the raw material compounds in the manufactured plate-like alumina particles was confirmed by the XPS analysis and the XRF analysis. In addition, Si, Ge, and Mo of the raw material compounds tended to be contained in the particle in accordance with the amounts used.

When attention is paid to the particle diameter of the alumina particle, particularly, the plate-like alumina particles of Examples 1 to 3 and Examples 5 to 7 had a significantly larger particle diameter than plate-like alumina obtained in the related art.

TABLE 2

| In forms of oxides | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Formulation | $Al_2O_3$ | 90.1 | 87.7 | 85.8 | 92.0 | 90.1 | 82.6 | 82.6 | 50.1 | — |
| | $MoO_3$ | 9.0 | 11.4 | 12.9 | 7.1 | 9.0 | 16.5 | 16.5 | 49.8 | — |
| | $SiO_2$ | 0.9 | 0.9 | 1.3 | 0.9 | 0 | 0 | 0.4 | 0.1 | — |
| | $Ge_2O$ | 0 | 0 | 0 | 0 | 0.9 | 0.8 | 0.4 | 0 | — |
| D10 [μm] | | 10 | 12 | 11 | 7 | 9 | 14 | 12 | 5 | 3 |
| L D50 [μm] | | 24 | 29 | 28 | 15 | 22 | 33 | 28 | 10.1 | 6 |
| D90 [μm] | | 44 | 50 | 48 | 30 | 45 | 55 | 45 | 19 | 11 |
| D [μm] | | 0.6 | 0.6 | 0.8 | 0.5 | 0.6 | 0.6 | 0.5 | 0.5 | 0.5 |
| Aspect ratio L/D | | 40 | 48 | 35 | 30 | 36.7 | 55 | 56 | 20 | 12 |
| XRD 2θ = 41.6° (006) | | 523 | 657 | 1020 | 345 | 753 | 1820 | 3158 | 330 | 227 |
| XRD 2θ = 43.3° (113) | | 1272 | 1209 | 227 | 1400 | 1245 | 234 | 429 | 1833 | 2847 |
| XRD intensity ratio (006/113) | | 0.41 | 0.54 | 4.5 | 0.25 | 0.6 | 7.8 | 7.4 | 0.18 | 0.08 |
| Presence or absence of mullite | | Present | Present | Present | Present | Absent | Absent | Present | Absent | Absent |
| XRD intensity ratio (mullite) | | 0.02 | 0.02 | 0.03 | 0.04 | — | — | 0.02 | 0.01 | — |
| XPS molar ratio [Si]/[Al] | | 0.24 | 0.21 | 0.28 | 0.30 | N.D. | N.D. | 0.15 | 0.11 | N.D. |
| XRF molar ratio [Si]/[Al] | | 0.0057 | 0.006 | 0.0063 | 0.0065 | N.D. | N.D. | 0.0037 | 0.002 | 0.001 |
| XPS molar ratio [Ge]/[Al] | | N.D. | N.D. | N.D. | N.D. | 0.085 | 0.082 | 0.039 | N.D. | N.D. |
| XRF molar ratio [Ge]/[Al] | | N.D. | N.D. | N.D. | N.D. | 0.0049 | 0.0057 | 0.0031 | N.D. | N.D. |
| XRF $SiO_2$ (% by mass) | | 0.7 | 0.7 | 0.9 | 1.2 | N.D. | N.D. | 0.4 | 0.21 | 0.156 |
| XRF $GeO_2$ (% by mass) | | N.D. | N.D. | N.D. | N.D. | 0.5 | 0.8 | 0.3 | N.D. | N.D. |
| XRF $MoO_3$ (% by mass) | | 0.3 | 0.3 | 0.4 | 0.3 | 0.2 | 0.4 | 0.3 | 1.39 | N.D. |
| Brilliance | | B | B | A | C | B | A | A | D | D |

It was confirmed that the powders obtained in Examples 1 to 7 and Comparative Example 1 and 2 had the particle diameter, the thickness, the aspect ratio, and the value of the (006/113) value shown in Table 2.

FIG. 1 shows an SEM observation image of the plate-like alumina particle of Example 1.

According to the comparisons of Examples 1 to 7 with Comparative Example 1 and 2, it was found that the plate-like alumina particles of Examples 1 to 7 having a high value of the (006/113) ratio had a larger ratio of a face corresponding to the (006) face and were further improved in It can be considered that, in Examples 1 to 3, it was possible to increase the value of the (006/113) ratio or the particle diameter by appropriately increasing the charge amounts of $MoO_3$ and $SiO_2$ prepared. It can be considered that, in Examples 5 to 7, it was possible to increase the value of the (006/113) ratio or the particle diameter by appropriately increasing the charge amount of $MoO_3$.

In the powders obtained in Examples 1 to 4 and Example 7, the values of the XRD peak intensity ratio were 0.02 or more, and the presence of mullite was recognized.

When attention is paid to the value of the XRD peak intensity ratio (mullite), it is found that there is a tendency that the amount of mullite generated increases as the amount of $SiO_2$ in the raw material prepared increases.

Further, the value of [Si]/[Al] measured by XRF is increased by increasing the amount of $SiO_2$ in the raw material prepared; however, in contrast, the XRD peak intensity ratio and the value of the XPS molar ratio [Si]/[Al] hit a peak at a certain degree in some cases. This is considered to be because the XRF analysis analyzes the entire sample, but XPS analyzes only several nanometers of the sample surface. That is, it is considered that the fact that the value of the XPS molar ratio [Si]/[Al] does not increase means that the amount of Si on the surface of the plate-like alumina particle is saturated and the surface layer of the plate-like alumina particle in this state is all coated with mullite.

The plate-like alumina particles obtained in Examples 1 to 4 and Example 7 imply that mullite was formed in the surface layer, and, in this surface layer, only mullite not including $SiO_2$ was unevenly distributed or, even when $SiO_2$ was included, the amount of mullite that was unevenly distributed was overwhelmingly larger.

When mullite is included in the surface layer, it is possible to provide a plate-like alumina particle that is more restrained from wearing an apparatus than a particle not including mullite in the surface layer. In a case where a surface treatment is performed on the plate-like alumina particle by using the above-described organosilane as a coupling agent, since alumina and mullite are strongly bound together and are not easily peeled off from each other, not only a strong bonding between mullite and Si in the organosilane coupling agent can be expected based on the strong anchoring between mullite and the Si, but a strong bonding between the organosilane coupling agent and a medium to be dispersed such as a binder can also be expected by selecting a functional group at the opposite side of Si in the organosilane coupling agent.

The results of the XRF molar ratio [Ge]/[Al] and the XPS molar ratio [Ge]/[Al] showed that, in the plate-like alumina particles obtained in Examples 5 to 7, germanium or a germanium compound was included in the surface layer or in the surface layer and the particle.

When germanium or a germanium compound is included in the surface layer, it is possible to provide a plate-like alumina particle that is more restrained from wearing an apparatus than a particle not including germanium or a germanium compound in the surface layer. In addition, in a case where a surface treatment is performed on the plate-like alumina particle by using the above-described organosilane as a coupling agent, not only a strong bonding between the layer including germanium and Si in the organosilane coupling agent can be expected based on the strong anchoring between the layer including germanium and Si in the organosilane coupling agent, but a strong bonding between the organosilane coupling agent and a medium to be dispersed such as a binder can also be expected by selecting a functional group at the opposite side of Si in the organosilane coupling agent.

Each configuration of each of the above-described embodiments or a combination or the like of the configurations is an example, and addition, omission, substitution, and other changes of the configuration may be performed within the bounds of not departing from the gist of the present invention. The present invention is not limited to each embodiment and is only defined by the scope of the claims.

INDUSTRIAL APPLICABILITY

It is possible to provide a plate-like alumina particle having a high value of the (006/113) ratio, a plate-like shape in which the ratio of a face corresponding to a (006) face is large, and excellent brilliance.

The invention claimed is:

1. A method for manufacturing a plate-like alumina particle, the method comprising:
   mixing an aluminum compound containing an aluminum element of 50% by mass or more in a form of $Al_2O_3$, a molybdenum compound containing a molybdenum element of 7% by mass or more and 40% by mass or less in a form of $MoO_3$, and a raw material germanium compound of 0.4% by mass or more and less than 1.5% by mass in a form of $GeO_2$ to produce a mixture; and
   firing the mixture,
   wherein each of the 50% by mass, the 7% by mass, the 40% by mass, the 0.4% by mass, and 1.5% by mass is a mass percentage with respect to a total amount of raw materials in forms of oxides which is assumed to be 100% by mass,
   for the plate-like alumina particle, a ratio I(006)/I(113) of a peak intensity I(006) to a peak intensity I(113) is 0.2 or more,
   the peak intensity I(006) is an intensity of a peak at 2θ=41.6±0.3 degrees which corresponds to a (006)-face diffraction peak obtained by X-ray diffraction measurement using a Cu-Kα ray, and
   the peak intensity I(113) is an intensity of a peak at 2θ=43.3±0.3 degrees which corresponds to a (113)-face diffraction peak obtained by X-ray diffraction measurement using a Cu-Kα ray.

2. The method according to claim 1, wherein a thickness of the plate-like alumina particle is 0.1 μm or more.

3. The method according to claim 1, wherein a $D_{50}$ value of the plate-like alumina particle is 20 μm or more.

4. The method according to claim 1, wherein the plate-like alumina particle comprises mullite in a surface layer.

5. The method according to claim 2, wherein a $D_{50}$ value of the plate-like alumina particle is 20 μm or more.

6. The method according to claim 2, wherein the plate-like alumina particle comprises mullite in a surface layer.

7. The method according to claim 3, wherein the plate-like alumina particle comprises mullite in a surface layer.

* * * * *